US010052903B2

(12) United States Patent
Loginov et al.

(10) Patent No.: US 10,052,903 B2
(45) Date of Patent: Aug. 21, 2018

(54) PROCESSES FOR IN-FIELD HARDENING OF OPTICAL EFFECT LAYERS PRODUCED BY MAGNETIC-FIELD GENERATING DEVICES GENERATING CONCAVE FIELD LINES

(71) Applicant: SICPA HOLDING SA, Prilly (CH)

(72) Inventors: Evgeny Loginov, Renens (CH); Mathieu Schmid, Lausanne (CH); Claude-Alain Despland, Prilly (CH); Pierre Degott, Crissier (CH)

(73) Assignee: SICPA HOLDING SA, Prilly (CH)

(*) Notice: Subject to any disclaimer, the term of this patent is extended or adjusted under 35 U.S.C. 154(b) by 0 days.

(21) Appl. No.: 15/500,089

(22) PCT Filed: Jul. 9, 2015

(86) PCT No.: PCT/EP2015/065695
§ 371 (c)(1),
(2) Date: Jan. 29, 2017

(87) PCT Pub. No.: WO2016/015973
PCT Pub. Date: Feb. 4, 2016

(65) Prior Publication Data

US 2017/0253070 A1 Sep. 7, 2017

(30) Foreign Application Priority Data

Jul. 29, 2014 (EP) .................................... 14178901

(51) Int. Cl.
*B32B 5/16* (2006.01)
*B42D 25/369* (2014.01)
(Continued)

(52) U.S. Cl.
CPC ............ *B42D 25/369* (2014.10); *B41F 11/02* (2013.01); *B41M 3/14* (2013.01); *B42D 25/29* (2014.10); *B42D 25/364* (2014.10); *B42D 25/41* (2014.10)

(58) Field of Classification Search
CPC . B41M 3/14; B41M 3/00; B41M 5/00; B41M 3/148; B42D 2033/16;
(Continued)

(56) References Cited

U.S. PATENT DOCUMENTS 2,570,856 A 10/1951 Carlton et al.
2,829,862 A 4/1958 Wey
(Continued)

FOREIGN PATENT DOCUMENTS

EP 0338378 10/1989
EP 0540455 5/1993
(Continued)

OTHER PUBLICATIONS

*The Printing ink manual*, R.H. Leach and R.J. Pierce, Springer Edition, 5th Edition, 2008, pp. 58-62.
(Continued)

*Primary Examiner* — Shin H Kim
(74) *Attorney, Agent, or Firm* — Muncy, Geissler, Olds & Lowe, P.C.

(57) ABSTRACT

A method is provided for freezing the orientation of orientable magnetic or magnetizable pigment particles by irradiation hardening the coating layer comprising the orientable magnetic or magnetizable pigment particles through the substrate carrying the coating layer. This method can be used in the protection of security documents, such as for example banknotes and identity documents, against counterfeit and illegal reproduction.

25 Claims, 8 Drawing Sheets

(51) Int. Cl.

| | |
|---|---|
| ***B41M 3/14*** | (2006.01) |
| ***B41F 11/02*** | (2006.01) |
| ***B42D 25/364*** | (2014.01) |
| ***B42D 25/41*** | (2014.01) |
| ***B42D 25/29*** | (2014.01) |

(58) Field of Classification Search
CPC ...... B42D 25/369; B42D 25/29; B05D 3/207; B05D 3/20; B05D 5/065; B05D 5/06; G07D 7/003; Y10T 428/2982
See application file for complete search history.

(56) References Cited

U.S. PATENT DOCUMENTS

| | | | | |
|---|---|---|---|---|
| 3,676,273 | A | 7/1972 | Graves | |
| 3,791,864 | A | 2/1974 | Steingroever | |
| 4,838,648 | A | 6/1989 | Phillips et al. | |
| 5,364,689 | A | 11/1994 | Kashiwagi et al. | |
| 5,630,877 | A | 5/1997 | Kashiwagi et al. | |
| 6,410,130 | B1 | 6/2002 | Schuhmacher et al. | |
| 6,531,221 | B1 | 3/2003 | Schuhmacher et al. | |
| 6,582,781 | B1 | 6/2003 | Schuhmacher et al. | |
| 6,838,166 | B2 | 1/2005 | Phillips et al. | |
| 7,047,883 | B2 | 5/2006 | Raksha et al. | |
| 7,047,888 | B2 | 5/2006 | Richards | |
| 7,517,578 | B2 | 4/2009 | Raksha et al. | |
| 8,025,952 | B2 | 9/2011 | Raksha et al. | |
| 8,343,615 | B2 | 1/2013 | Raksha et al. | |
| 2005/0106367 | A1 * | 5/2005 | Raksha .................. | B05D 3/207 428/199 |
| 2006/0194040 | A1 * | 8/2006 | Raksha .................. | B05D 3/207 428/323 |
| 2013/0084411 | A1 | 4/2013 | Raksha et al. | |
| 2016/0075166 | A1 * | 3/2016 | Ritter ................... | B42D 25/355 283/107 |

FOREIGN PATENT DOCUMENTS

| | | | |
|---|---|---|---|
| EP | 0686675 | | 12/1995 |
| EP | 1710756 | | 10/2006 |
| EP | 1819525 | | 3/2010 |
| EP | 1666546 | | 10/2010 |
| EP | 2306222 | | 4/2011 |
| EP | 2325677 | | 5/2011 |
| EP | 2402401 | | 1/2012 |
| EP | 2433798 | | 3/2012 |
| EP | 2639077 | | 9/2013 |
| JP | 06122848 | | 3/1992 |
| WO | 2000053423 | | 9/2000 |
| WO | 2002073250 | | 9/2002 |
| WO | 2002090002 | | 11/2002 |
| WO | 2003000801 | | 1/2003 |
| WO | 2005002866 | | 1/2005 |
| WO | 2005051675 | | 6/2005 |
| WO | 2006063926 | | 6/2006 |
| WO | 2007131833 | | 11/2007 |
| WO | 2008046702 | | 4/2008 |
| WO | 2010058026 | | 5/2010 |
| WO | 2011092502 | | 8/2011 |
| WO | 2012038531 | | 3/2012 |
| WO | 2012104098 | A1 | 8/2012 |
| WO | 2012176126 | A1 | 12/2012 |

OTHER PUBLICATIONS

Printing Technology, J.M. Adams and P.A. Dolin, Delmar Thomson Learning, 5th Edition, 2002, pp. 293-328.
"Handbook of print media", Helmut Kipphan, Springer Edition, 2001, p. 48.
*The Printing ink manual*, R.H. Leach and R.J. Pierce, Springer Edition, $5^{th}$ Edition, 2008, pp. 42-51.
*Printing Technology*, J. M. Adams P.A. Dolin, Delmar Thomson Learning, $5^{th}$ Edition, 2008, pp. 359-360.
*The Printing ink manual*, R.H. Leach and R.J. Pierce, Springer Edition, $5^{th}$ Edition, 2008, pp. 33-42.
"Chemistry & Technology of UV & EB Formulation for Coatings, Inks & Paints", vol. III, "Photoinitiators for Free Radical Cationic and Anionic Polymerization", 2nd edition, by J. V. Crivello& K. Dietliker, edited by G. Bradley and published in 1998 by John Wiley & Sons in association with SITA Technology Limited.
International Search Report, Written Opinion and International Preliminary Report on Patentability issued with respect to application No. PCT/EP2015/065695.

* cited by examiner

PROCESSES FOR IN-FIELD HARDENING OF OPTICAL EFFECT LAYERS PRODUCED BY MAGNETIC-FIELD GENERATING DEVICES GENERATING CONCAVE FIELD LINES

FIELD OF THE INVENTION

The present invention relates to the field of the protection of value documents and value commercial goods against counterfeit and illegal reproduction. In particular, the present invention relates to devices and processes for producing

BACKGROUND OF THE INVENTION

It is known in the art to use inks, compositions or layers containing magnetic or magnetizable particles or pigments, particularly also magnetic optically variable pigments, for the production of security elements, e.g. in the field of security documents. Coatings or layers comprising oriented magnetic or magnetizable particles are disclosed for example in U.S. Pat. No. 2,570,856; U.S. Pat. No. 3,676,273; U.S. Pat. No. 3,791,864; U.S. Pat. No. 5,630,877 and U.S. Pat. No. 5,364,689. Coatings or layers comprising oriented magnetic color-shifting pigment particles, resulting in particularly appealing optical effects, useful for the protection of security documents, have been disclosed in WO 2002/090002 A2 and WO 2005/002866 A1.

Security features, e.g. for security documents, can generally be classified into "covert" security features one the one hand, and "overt" security features on the other hand. The protection provided by covert security features relies on the concept that such features are difficult to detect, typically requiring specialized equipment and knowledge for detection, whereas "overt" security features rely on the concept of being easily detectable with the unaided human senses, e.g. such features may be visible and/or detectable via the tactile senses while still being difficult to produce and/or to copy. However, the effectiveness of overt security features depends to a great extent on their easy recognition as a security feature, because most users, and particularly those having no prior knowledge of the security features of a therewith secured document or item, will only then actually perform a security check based on said security feature if they have actual knowledge of their existence and nature.

A particularly striking optical effect can be achieved if a security feature changes its appearance in view to a change in viewing conditions, such as the viewing angle. Such an effect can e.g. by obtained by dynamic appearance-changing optical devices (DACODs), such as concave, respectively convex Fresnel type reflecting surfaces relying on oriented pigment particles in a hardened coating layer, as disclosed in EP 1 710 756 A1. This document describes one way to obtain a printed image that contains pigment particles or flakes having magnetic properties by aligning the pigment particles in a magnetic field. The pigment particles or flakes, after their alignment in a magnetic field, show a Fresnel structure arrangement, such as a Fresnel reflector. By tilting the image and thereby changing the direction of reflection towards a viewer, the area showing the greatest reflection to the viewer moves according to the alignment of the flakes or pigment particles.

While the Fresnel type reflecting surfaces are flat, they provide the appearance of a concave or convex reflecting hemisphere. Said Fresnel type reflecting surfaces can be produced by exposing a wet coating layer comprising non-isotropically reflecting magnetic or magnetizable pigment particles to the magnetic field of a single dipole magnet, wherein the latter is disposed above for concave effect (FIG. 2C bottom), respectively below the plane of the coating layer for convex effect (FIG. 2C top), as illustrated in FIG. 7B of EP 1 710 756 A1 for a convex orientation. The so-oriented pigment particles are consequently fixed in position and orientation by hardening the coating layer.

One example of such a structure is the so-called "rolling bar" effect, as disclosed in US 2005/0106367 and U.S. Pat. No. 7,047,883. A "rolling bar" feature is based on pigment particles orientation imitating a curved surface across the coating and provides the optical illusion of movement to images comprised of oriented pigment particles. The observer sees a specular reflection zone which moves away or towards the observer as the image is tilted. A so-called positive rolling bar comprises pigment particles oriented in a concave fashion (FIG. 2B) and follows a positively curved surface; a positive rolling bar moves with the rotation sense of tilting. A so-called negative rolling bar comprises pigment particles oriented in a convex fashion (FIGS. 1 and 2A) and follows a negatively curved surface; a negative rolling bar moves against the rotation sense of tilting. A hardened coating comprising pigment particles having an orientation following a concave curvature (positive curve orientation, shows a visual effect characterized by an upward movement of the rolling bar (positive rolling bar) when the support is tilted backwards. The concave curvature refers to the curvature as seen by an observer viewing the hardened coating from the side of the support carrying the hardened coating (FIG. 2B). A hardened coating comprising pigment particles having an orientation following a convex curvature (negative curve orientation, FIG. 2A) shows a visual effect characterized by a downward movement of the rolling bar (negative rolling bar) when the support carrying the hardened coating is tilted backwards (i.e. the top of the support moves away from the observer while the bottom of the support moves towards from the observer) (FIG. 1). This effect is nowadays utilized for a number of security elements on banknotes, such as on the "5" of the 5 Euro banknote or the "100" of the 100 Rand banknote of South Africa.

For optical effect layers printed on a substrate, negative rolling bar features (orientation of the pigment particles (PP) in a convex fashion, curve (FIG. 1 and FIG. 2A) are produced by exposing a wet and not yet hardened coating layer to the magnetic field of a magnet located on the opposite side of the substrate to the coating layer (FIG. 2C top and FIG. 3), whereas positive rolling bar features (orientation of the pigment particles (PP) in a concave fashion, curve (FIG. 2B) are produced by exposing a wet and not yet hardened coating layer to the magnetic field of a magnet located on the same side of the substrate as the coating layer (FIG. 2C bottom and FIG. 4A left). Examples of positive and negative rolling bar features and combinations thereof, i.e. double rolling bar features and triple rolling bar features, have been disclosed in US 2005/0106367 and in WO 2012/104098 A1, respectively. For positive rolling bar features wherein magnet is facing the still wet and not yet hardened coating layer, a simultaneous curing of the coating layer with an irradiation source, such as for example a UV irradiation source, for fixing the orientation of the pigment particles within the coating layer is prevented thus allowing said curing only after the removal of the coating layer from the magnet.

U.S. Pat. No. 2,829,862 teaches the importance of the viscoelastic properties of the carrier material for preventing reorientation of the magnetic or magnetizable pigment particles after the removal of the external magnet. Maintaining the coating composition comprising the magnetic or magnetizable pigment particles or flakes within the magnetic field during the curing process preserves the orientation of the magnetic or magnetizable pigment particles. Examples of such processes are disclosed for example in WO 2012/038531 A1, EP 2433798 A1 and US 2005/0106367. In all these examples, the external magnetic device is located on the side of the substrate opposite to the side carrying the coating composition and the curing process is triggered by an irradiation source located on the side of the substrate carrying the coating composition.

It is known in the art that when a coating or ink composition is cured using a UV-VIS irradiation source, the exposure conditions of the coating or ink composition to the irradiation source are crucial to obtain a through-cure and fast curing of the composition. Preferably the irradiation source is located directly facing the to-be-cured coating or ink composition.

JP 06122848 discloses a printing method for intaglio printing wherein an intaglio ink is cured with electron beam from the backside of the substrate immediately after the ink application. Whereas curing with the use of electron beam allows curing through optically opaque material, however, said mechanism requires shielding of the apparatus with heavy metal parts thus leading to cumbersome equipments and being highly demanding in term of safety. Moreover, electron beam curing is strongly inhibited by atmosphere such that efficient curing disadvantageously need inert atmosphere.

EP 0338378 A1 discloses a method for producing documents or other articles containing at least one replica of a surface relief diffraction pattern. The method comprise the steps of printing a liquid casting resin on a defined area of a substrate, holding the resin between the substrate and a master of the surface relief pattern and curing it. The type of radiation that is used depends primarily upon the resin formulation and the nature of the substrate material. For substrate made of papers or of other opaque sheet material, electron beam is preferred. For optically transparent sheet material, UV-Vis irradiation may be used.

WO 2005/051675 A1 discloses an apparatus and a method for printing a curable composition to produce diffraction grating on a security product. The composition is cured by using UV-Vis irradiation or electron beam. If the curable composition is applied on a paper substrate and is cured with a UV-Vis irradiation lamp, the lamp is preferably located on or in the means used to form the diffraction grating, i.e. the UV-lamp is located on the front side of the substrate carrying the curable composition. Other examples of holograms prepared by contacting liquid composition with relief structure while simultaneously curing the composition with electron beam from the backside of the substrate have been disclosed e.g. in WO 2000/0534223 A1 or in EP 540450 A1. WO 2012/176126 A1 discloses a method and an apparatus for forming a surface relief microstructure on a paper substrate. The method comprises the steps of applying a composition on the front side of a substrate, contacting at least a portion of the curable composition with surface relief microstructure, and curing the coating composition by using at least one UV-lamp which is arranged on the backside of the paper substrate.

WO 02/090002 A2 discloses a method for producing image coated articles by using magnetic pigments. The method comprises the steps of applying to a substrate a liquid coating comprising non-spherical magnetic pigments dispersed in a pigment vehicle, exposing the liquid coating to a magnetic field and solidifying the coating by exposure to electromagnetic radiation. The solidifying step may be performed with a device comprising a lamp equipped with a photomask such that only parts of the liquid coating are selectively cured, while un-exposed parts of the coating remain liquid. The non-spherical magnetic pigments dispersed in the un-exposed parts of the liquid coating may be re-oriented using a second magnetic field.

Therefore, there remains a need for a process to produce security features displaying a OEL on a substrate, said OEL comprising a plurality magnetic or magnetizable pigment particles oriented in a concave fashion.

SUMMARY OF THE INVENTION

Accordingly, it is an object of the present invention to provide, a method comprising a step of applying an external magnetic device located on the side of the OEL and simultaneously or partially simultaneously hardening a coating layer comprising a plurality of magnetic or magnetizable pigment particles by irradiation while avoiding the drawbacks of the prior art.

This is achieved by the provision of a process for producing an optical effect layer (OEL) on a substrate as well as optical effect layers produced thereof, said process comprising the steps of:

a) applying on the substrate a coating composition comprising a plurality of magnetic or magnetizable pigment particles so as to form a coating layer, said coating layer being in a first state;

b) b1) exposing the coating layer to the magnetic field of a magnetic-field-generating device, said magnetic-field-generating device being located on the side of the coating layer thereby orienting the plurality of magnetic or magnetizable pigment particles, and b2) and simultaneously or partially simultaneously hardening through the substrate the coating layer to a second state so as to fix the magnetic or magnetizable pigment particles in their adopted positions and orientations, said hardening being performed by irradiation with a UV-Vis irradiation source located on the side of the substrate;

wherein the substrate is transparent to electromagnetic radiation of one or more wavelengths of the emission spectrum of the irradiation source in the range of 200 nm to 500 nm, and wherein the plurality of magnetic or magnetizable pigment particles is oriented so as to follow a concave curvature when viewed from the side carrying the OEL.

Also described herein are processes for producing an optical effect layer (OEL) on the substrate described herein, said OEL comprising a motif made of at least two adjacent patterns made of a single hardened layer, said process comprising the steps of:

a) applying on the substrate described herein the coating composition comprising a plurality of magnetic or magnetizable particles described herein so as to form a coating layer, said coating layer being in a first state;

b)

b1) exposing one or more first substrate areas carrying the coating layer to the magnetic field of a first magnetic-field-generating device, said magnetic-field-generating device being located on the side of the coating layer thereby orienting the plurality of magnetic or magnetizable pigment particles so as to follow a concave curvature when viewed from the side carrying the coating layer, and b2) simultaneously or partially simultaneously hardening through the substrate the coating layer as described herein, said hardening being performed by irradiation with a UV-Vis irradiation source located on the side of the substrate, wherein said UV-Vis irradiation source is equipped with a photomask such that one or more second substrate areas carrying the coating layer are not exposed to the UV-Vis irradiation;

c) exposing at least the one or more second substrate areas carrying the coating layer which are in a first state due to the presence of the photomask under step b2) to the magnetic field of a second magnetic-field-generating device thereby orienting the plurality of magnetic or magnetizable pigment particles so as to follow any orientation except a random orientation; and simultaneously, partially simultaneously or subsequently, preferably simultaneously or partially simultaneously, hardening by irradiation with a UV-Vis irradiation source at least the one or more second substrate areas carrying the coating layer to a second state so as to fix the magnetic or magnetizable pigment particles in their adopted positions and orientations, wherein, the substrate under step a) is transparent to one or more wavelengths of the emission spectrum of the irradiation source in the range of 200 nm to 500 nm.

Also described herein are processes for producing an optical effect layer (OEL) on the substrate described herein, said OEL comprising a motif made of at least two adjacent patterns made of a single hardened layer, said process comprising the steps of:

a) applying on the substrate a coating composition comprising a plurality of magnetic or magnetizable particles so as to form a coating layer, said coating layer being in a first state;

b)

b1) exposing one or more first substrate areas carrying the coating layer to the magnetic field of a first magnetic-field-generating device thereby orienting the plurality of magnetic or magnetizable pigment particles so as to follow any orientation except a random orientation, and b2) simultaneously, partially simultaneously or subsequently hardening the coating layer as described herein, said hardening being performed by irradiation with a UV-Vis irradiation source equipped with a photomask such that one or more second substrate areas carrying the coating layer are not exposed to the UV-Vis irradiation; and c) exposing at least the one or more second substrate areas carrying the coating layer which are in a first state due to the presence of the photomask under step b2) to the magnetic field of a second magnetic-field-generating device, said magnetic-field-generating device being located on the side of the coating layer thereby orienting the plurality of magnetic or magnetizable pigment particles so as to follow a concave curvature when viewed from the side carrying the coating layer; and simultaneously or partially simultaneously hardening through the substrate at least the one or more second substrate areas carrying the coating layer, said hardening being performed by irradiation with a UV-Vis irradiation source located on the side of the substrate, wherein the substrate under step a) is transparent to one or more wavelengths of the emission spectrum of the irradiation source in the range of 200 nm to 500 nm.

Also described herein are optical effect layers (OEL) produced by the process described herein as well as uses of said optical effect layers for the protection of a security document against counterfeiting or fraud as well as uses for a decorative application.

Also described herein are security documents and decorative elements or objects comprising one or more optical effect layers (OELs) described herein.

The present invention discloses a method for freezing in-field the orientation of orientable magnetic or magnetizable pigment particles by hardening the coating layer comprising the orientable magnetic or magnetizable pigment particles by irradiating the coating layer through the substrate carrying it.

DETAILED DESCRIPTION

Definitions

The following definitions are to be used to interpret the meaning of the terms discussed in the description and recited in the claims.

As used herein, the indefinite article "a" indicates one as well as more than one and does not necessarily limit its referent noun to the singular.

As used herein, the term "about" means that the amount or value in question may be the specific value designated or some other value in its neighborhood. Generally, the term "about" denoting a certain value is intended to denote a range within ±5% of the value. As one example, the phrase "about 100" denotes a range of 100±5, i.e. the range from 95 to 105. Generally, when the term "about" is used, it can be expected that similar results or effects according to the invention can be obtained within a range of ±5% of the indicated value.

As used herein, the term "and/or" means that either all or only one of the elements of said group may be present. For example, "A and/or B" shall mean "only A, or only B, or both A and B". In the case of "only A", the term also covers the possibility that B is absent, i.e. "only A, but not B".

The term "comprising" as used herein is intended to be non-exclusive and open-ended. Thus, for instance a coating layer comprising a compound A may include other compounds besides A. However, the term "comprising" also covers the more restrictive meanings of "consisting essentially of" and "consisting of", so that for instance "a coating layer comprising a compound A" may also (essentially) consist of the compound A.

The term "coating composition" refers to any composition which is capable of forming an optical effect layer (OEL) as used herein on a solid substrate and which can be applied preferentially but not exclusively by a printing method. The coating composition comprises at least a plurality of magnetic or magnetizable pigment particles and a binder.

The term "optical effect layer (OEL)" as used herein denotes a layer that comprises a plurality of oriented magnetic or magnetizable pigment particles and a binder, wherein the non-random orientation of the magnetic or magnetizable pigment particles is fixed or frozen within the binder.

The term "rolling bar" or "rolling bar feature" denotes an area within the OEL that provides the optical effect or optical impression of a cylindrical bar shape lying crosswise within the OEL, with the axis of the cylindrical bar lying parallel to the plane of the OEL and the part of the curved surface of the cylindrical bar being above the plane of the OEL. The "rolling bar", i.e. the cylindrical bar shape, can be symmetrical or non-symmetrical, i.e. the radius of the cylindrical bar may be constant or not constant; when the radius of the cylindrical bar is not constant, the rolling bar having a conical form.

Figure 1:
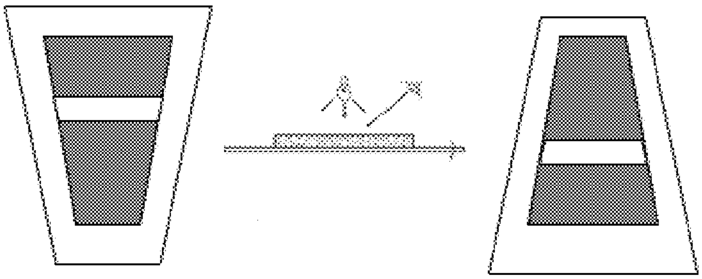
FIG. 1 schematically illustrates a rolling bar feature with a convex curvature (negative rolling bar feature) according to the Prior Art.
Figure 2A:
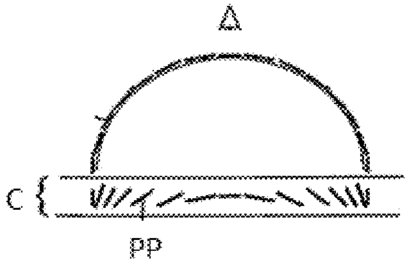
FIG. 2A-B schematically illustrate pigment particles following the tangent to a negatively curved magnetic field line in a convex fashion (FIG. 2A) and the tangent to a positively curved magnetic field line in a concave fashion (FIG. 2B). "C" denotes a coating layer comprising magnetic or magnetizable pigment particles "PP".
Figure 2B:
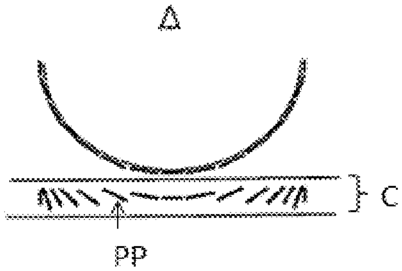

The terms "convex fashion" or "convex curvature" and the terms "concave fashion" or "concave curvature" refer to the curvature of a Fresnel surface across the OEL that provides the optical effect or the optical impression of a rolling bar. A Fresnel surface is a surface comprising microstructures in the form of a series of grooves with changing slope angles. At the position where the OEL is produced, the magnetic-field-generating device orients the magnetic or magnetizable pigment particles following the tangent to the curved surface. The terms "convex fashion" or "convex curvature" and the terms "concave fashion" or "concave curvature" refer to the apparent curvature of the curved surface as seen by an observer viewing the optical effect layer OEL from the side of the substrate carrying the OEL. The curvature of the curved surface follows the magnetic field lines produced by the magnetic field-generating device at the position where the OEL is produced. A "convex curvature" refers to a negatively curved magnetic field line (as shown in FIG. 2A); a "concave curvature" refers to a positively curved magnetic field line (as shown in FIG. 2B).

The term "security element" is used to denote an image or graphic element that can be used for authentication purposes. The security element can be an overt and/or a covert security element.

The term "harden", "hardened" and "hardening" are used to denote an increase of viscosity in reaction to stimulus to convert a material into state, i.e. a hardened or solid state where the magnetic or magnetizable pigment particles are fixed or frozen in their current positions and orientations and can no longer move nor rotate.

The present invention provides processes for producing optical effect layers (OEL) comprising a plurality of oriented magnetic or magnetizable pigment particles on a substrate, wherein said plurality of magnetic or magnetizable pigment particles is oriented so as to follow a concave curvature when viewed from the side carrying the OEL, in particular wherein said plurality of magnetic or magnetizable pigment particles is oriented so that the OEL exhibit a positive rolling bar feature.

Figure 2C:
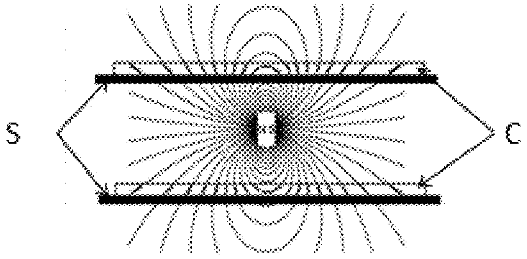
FIG. 2C schematically illustrates a magnetic-field generating device suitable for forming a magnetic field in a convex fashion (top) or a concave fashion (bottom) as a function of its position. "S" denotes a substrate, "C" denotes a coating layer comprising magnetic or magnetizable pigment particles.

As described in the prior art, for example in U.S. Pat. No. 7,047,888, U.S. Pat. No. 7,517,578 and WO 2012/104098 A1 and as illustrated in FIG. 2C, known methods to obtain on a substrate a magnetic or magnetizable pigment particles orientation following a negative curve (convex curvature when viewed from the side carrying the coating layer, illustrated by an eye, see FIG. 2A) include the use of a magnetic-field generating device to orient the pigment particles (PP), said device being placed underneath the substrate (FIG. 2C top). To obtain on a substrate a magnetic or magnetizable pigment particles orientation following a positive curve (concave curvature when viewed from the side carrying the coating layer, illustrated by an eye, see FIG. 2B), the magnetic-field generating device used to orient the pigment particles (PP) is placed above the substrate (FIG. 2C, below), i.e. the device faces the coating layer comprising the magnetic or magnetizable pigment particles.

Figure 3:
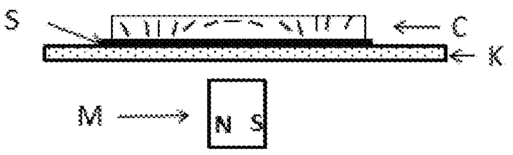
FIG. 3 schematically illustrates a magnetic-field generating device suitable for forming a negatively curved magnetic field line in a convex fashion according to the prior art.

FIG. 3 illustrates an example of a magnet (M) suitable to produce optical effect layers based on a plurality of magnetic or magnetizable pigment particles oriented so as to follow a convex curvature when viewed from the side carrying the coating layer (C), in particular optical effect layers exhibiting a negative rolling bar feature, (orientation of the pigment particles (PP) in a convex fashion (FIG. 2A)) produced by exposing a wet and not yet hardened coating layer to the magnetic field of a magnet located on the side of (underneath) the substrate (S).

Figure 4A:
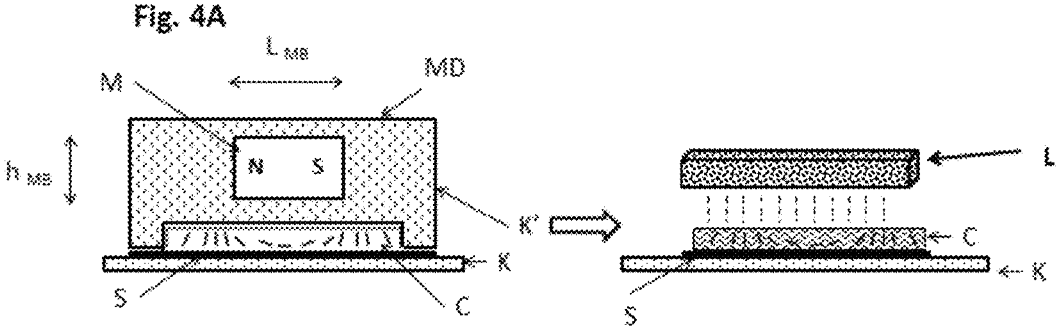
FIG. 4A schematically illustrates an example of a comparative process using a magnetic-field generating device and irradiation source suitable for forming a rolling bar feature following a positively curved magnetic field line in a concave fashion (prior art).

FIG. 4A illustrates an example of magnetic-field generating device (MD) suitable to produce an OEL based on a plurality of magnetic or magnetizable pigment particles oriented so as to follow a concave curvature when viewed from the side carrying the coating layer (C), in particular optical effect layers exhibiting a positive rolling bar feature (orientation of the pigment particles in a concave fashion (FIG. 2B)) by exposing a wet and not yet hardened coating layer (C) to the magnetic field of a magnet (M) located on the side carrying the coating layer (C).

Figure 4B:
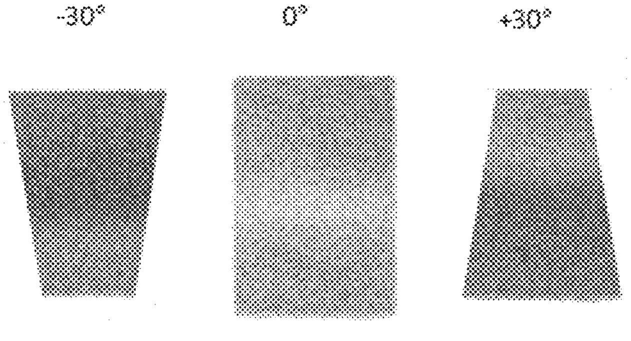
FIG. 4B shows an example of a rolling bar feature produced by using the process illustrated in FIG. 4A as seen under different viewing angles.

For positive rolling bar features produced using a magnetic-field generating device facing the still wet and not yet hardened coating layer as disclosed in WO 2012/104098 A1 (FIG. 4A), the position of the magnetic-field generating device (MD) prevents the hardening of the coating layer (C) to be done simultaneously with the orienting step of the magnetic or magnetizable pigment particles. FIG. 4A illustrates a magnetic-field generating device (MD) comprising a magnet (M) and an optional magnetic device housing (K') with a recess engraved in its surface such that the magnet (M) may be located on the substrate (S) carrying the coating composition (C) without being in direct contact with the coating composition. Subsequently to the removal of the magnet (M), the coating layer (C) is hardened by irradiating with a UV-Vis irradiation source located on the side carrying the coating layer (C). FIG. 4B shows an example of an OEL comprising a positive rolling bar feature produced according to the method illustrated in FIG. 4A. As illustrated in FIG. 4B, the OEL comprising a rolling bar feature produced with this method shows a large bright zone which only exhibits a slight apparent movement with changing angle, i.e. a poor and hardly-eye-catching dynamic effect.

Figure 5A:
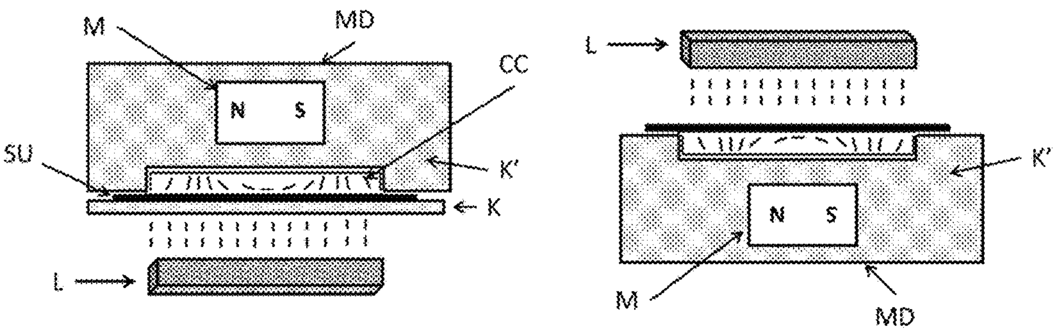
FIG. 5A schematically illustrates an example of a process using a magnetic-field generating device and an irradiation source suitable for forming a rolling bar feature following a positively curved magnetic field line in a concave fashion according to the present invention.

FIG. 5A schematically illustrates an example of a process using a magnetic-field generating device and an irradiation source suitable for forming a rolling bar feature following a positively curved magnetic field line in a concave fashion according to the present invention.

Suitable substrates for the present invention are transparent to one or more wavelengths of the emission spectrum of the radiation source used to harden the coating composition on said substrates, i.e. the substrates must exhibit transmission of electromagnetic radiations of at least 4%, preferably at least 8% at one or more wavelengths of the emission spectrum of the radiation source in the range of 200 nm to 500 nm. As mentioned herein and as known by the man skilled in the art, the coating compositions to be hardened on the substrate comprise one or more photoinitiators optionally with one or more photosensitizers, said one or more photoinitiators and optional one or more photosensitizers being selected according to its/their absorption spectrum/spectra in correlation with the emission spectrum of the radiation source. Depending on the degree of transmission of the electromagnetic radiation through the substrate, hardening of the coating layer may be obtained by increasing the irradiation time. However, depending on the substrate material, the irradiation time is limited by the substrate material and its sensitivity to the heat produced by the radiation source.

The radiation to harden the coating composition on the substrate described herein is effected with light of a wavelength from about 200 nm to about 500 nm. A large number of widely varying types of radiations sources may be used. Point sources and also planiform radiators (lamp carpets are suitable). Examples thereof include without limitation carbon arc lamps, xenon arc lamps, medium-, high- and low-pressure mercury lamps, dopes where appropriate with metal halides (metal halides lamps), microwave-excited metal vapor lamps, excimer lamps, superactinid fluorescent tubes, fluorescent lamps, argon incandescent lamps, flashlamps, photographic flood lights and light emitting diodes (LED).

The substrate described herein is preferably selected from the group consisting of papers or other fibrous materials such as cellulose, paper-containing materials, glasses, ceramics, plastics and polymers, composite materials and mixtures or combinations thereof, provided that the substrate is transparent to one or more wavelengths of the emission spectrum of the radiation source used to harden the coating composition. Typical paper, paper-like or other fibrous materials are made from a variety of fibers including without limitation abaca, cotton, linen, wood pulp, and blends thereof. As is well known to those skilled in the art, cotton and cotton/linen blends are preferred for banknotes, while wood pulp is commonly used in non-fiduciary documents. The substrate may be coated with a primer, provided that the substrate is transparent to one or more wavelengths of the emission spectrum of the radiation source used to harden the coating composition. Examples of such primer are disclosed e.g. in WO 2010/058026 A2. Typical examples of plastics and polymers include polyolefins such as polyethylene (PE) and polypropylene (PP), polyamides, polyesters such as poly(ethylene terephthalate) (PET), poly(1,4-butylene terephthalate) (PBT), poly(ethylene 2,6-naphthoate) (PEN) and polyvinylchlorides (PVC). Spunbond olefin fibers such as those sold under the trademark Tyvek® may also be used as substrate. Typical examples of composite materials include without limitation multilayer structures or laminates of paper and at least one plastic or polymer material such as those described hereabove as well as plastic and/or polymer fibers incorporated in a paper-like or fibrous material such as those described hereabove. Of course, the substrate can comprise further additives that are known to the skilled person, such as sizing agents, whiteners, processing aids, reinforcing or wet strengthening agents etc., provided that the substrate is transparent to one or more wavelengths of the emission spectrum of the radiation source used to harden the coating composition.

Figure 9:
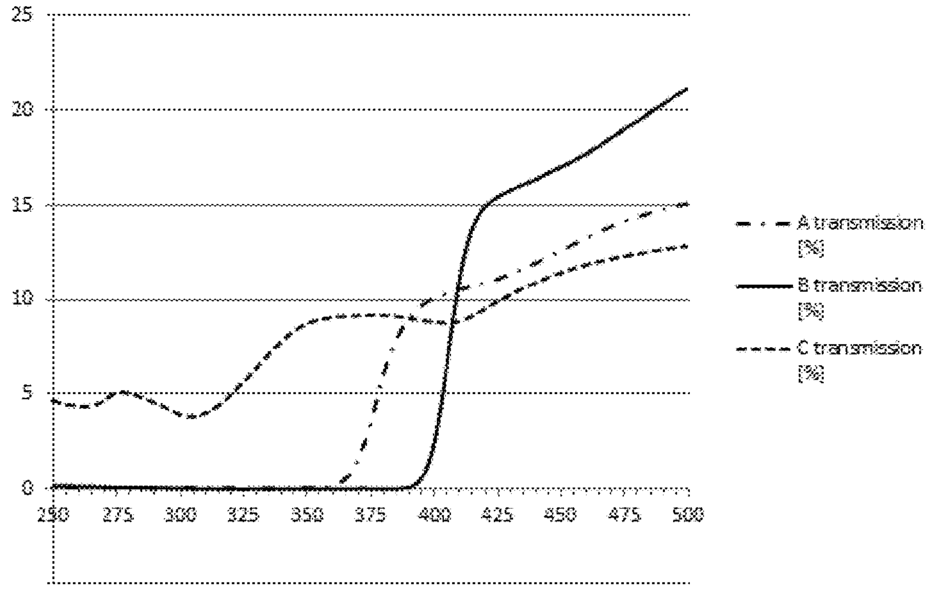
FIG. 9 illustrates transmission spectra of various substrates.

FIG. 9 shows the transmission spectra of different substrates, i.e. a fiduciary paper from Louisenthal (A), a non-fiduciary paper coated with a primer (B) and a polymer substrate used for banknote (C) (a white Guardian® substrate, i.e. a biaxially oriented polypropylene (BOPP) substrate comprising 5 opacifying layers). The transmission of the electromagnetic irradiation through the substrates was measured on a Perkin Elmer Lambda 950 equipped with a Deuterium (UV) and a Xenon (VIS) lamp and a UV WinLab Data Processor. Measurement mode: integration sphere transmission. The substrate specimens were fixed on the sample holder. The transmission spectra were measured for the range between 250 nm and 500 nm.

The process described herein comprises a step of applying on the substrate described herein a coating composition comprising a plurality of magnetic or magnetizable pigment particles so as to form a coating layer, said coating composition being in a first state. Preferably, said step is carried out by a printing process preferably selected from the group consisting of screen printing, rotogravure printing and flexography printing.

Screen printing (also referred in the art as silkscreen printing) is a stencil process whereby an ink is transferred to a surface through a stencil supported by a fine fabric mesh of silk, mono- or multi-filaments made of synthetic fibers such as for example polyamides or polyesters or metal threads stretched tightly on a frame made for example of wood or a metal (e.g. aluminum or stainless steel). Alternatively, the screen-printing mesh may be a chemically etched, a laser-etched, or a galvanically formed porous metal foil, e.g. a stainless steel foil. The pores of the mesh are block-up in the non-image areas and left open in the image area, the image carrier being called the screen. Screen printing might be flat-bed or rotary. Screen printing is further described for example in *The Printing ink manual*, R. H. Leach and R. J. Pierce, Springer Edition, $5^{th}$ Edition, pages 58-62 and in *Printing Technology*, J. M. Adams and P. A. Dolin, Delmar Thomson Learning, $5^{th}$ Edition, pages 293-328.

Rotogravure (also referred in the art as gravure) is a printing process wherein the image elements are engraved into the surface of a cylinder. The non-image areas are at a constant original level. Prior to printing, the entire printing plate (non-printing and printing elements) is inked and flooded with ink. Ink is removed from the non-image by a wiper or a blade before printing, so that ink remains only in the cells. The image is transferred from the cells to the substrate by a pressure typically in the range of 2 to 4 bars and by the adhesive forces between the substrate and the ink. The term rotogravure does not encompass intaglio printing processes (also referred in the art as engraved steel die or copper plate printing processes) which rely for example on a different type of ink. More details are provided in "Handbook of print media", Helmut Kipphan, Springer Edition, page 48 and in *The Printing ink manual*, R. H. Leach and R. J. Pierce, Springer Edition, $5^{th}$ Edition, pages 42-51.

Flexography preferably uses a unit with a doctor blade, preferably a chambered doctor blade, an anilox roller and plate cylinder. The anilox roller advantageously has small cells whose volume and/or density determines the ink application rate. The doctor blade lies against the anilox roller, and scraps off surplus ink at the same time. The anilox roller transfers the ink to the plate cylinder which finally transfers the ink to the substrate. Specific design might be achieved using a designed photopolymer plate. Plate cylinders can be made from polymeric or elastomeric materials. Polymers are mainly used as photopolymer in plates and sometimes as a seamless coating on a sleeve. Photopolymer plates are made from light-sensitive polymers that are hardened by ultraviolet (UV) light. Photopolymer plates are cut to the required size and placed in an UV light exposure unit. One side of the plate is completely exposed to UV light to harden or cure the base of the plate. The plate is then turned over, a negative of the job is mounted over the uncured side and the plate is further exposed to UV light. This hardens the plate in the image areas. The plate is then processed to remove the unhardened photopolymer from the nonimage areas, which lowers the plate surface in these nonimage areas. After processing, the plate is dried and given a post-exposure dose of UV light to cure the whole plate. Preparation of plate cylinders for flexography is described in *Printing Technology*, J. M. Adams and P. A. Dolin, Delmar Thomson Learning, $5^{th}$ Edition, pages 359-360 and in *The Printing ink manual*, R. H. Leach and R. J. Pierce, Springer Edition, $5^{th}$ Edition, pages 33-42.

The coating composition described herein as well as the coating layer described herein comprise a plurality of magnetic or magnetizable pigment particles, preferably non-spherical magnetic or magnetizable pigment particles. Preferably, the magnetic or magnetizable pigment particles described herein are present in an amount from about 5 wt-% to about 40 wt-%, more preferably about 10 wt-% to about 30 wt-%, the weight percentages being based on the total weight of the coating composition.

Non-spherical magnetic or magnetizable pigment particles described herein are defined as having, due to their non-spherical shape, non-isotropic reflectivity with respect to an incident electromagnetic radiation for which the hardened binder material is at least partially transparent. As used herein, the term "non-isotropic reflectivity" denotes that the proportion of incident radiation from a first angle that is reflected by a particle into a certain (viewing) direction (a second angle) is a function of the orientation of the particles, i.e. that a change of the orientation of the particle with respect to the first angle can lead to a different magnitude of the reflection to the viewing direction. The non-spherical magnetic or magnetizable pigment particles are preferably prolate or oblate ellipsoid-shaped, platelet-shaped or needle-shaped particles or a mixture of two or more thereof and more preferably platelet-shaped particles.

Suitable examples of magnetic or magnetizable pigment particles, in particular non-spherical magnetic or magnetizable pigment particles, described herein include without limitation pigment particles comprising a magnetic metal selected from the group consisting of cobalt (Co), iron (Fe), gadolinium (Gd) and nickel (Ni); a magnetic alloy of iron, manganese, cobalt, nickel or a mixture of two or more thereof; a magnetic oxide of chromium, manganese, cobalt, iron, nickel or a mixture of two or more thereof; or a mixture of two or more thereof. The term "magnetic" in reference to the metals, alloys and oxides is directed to ferromagnetic or ferrimagnetic metals, alloys and oxides. Magnetic oxides of chromium, manganese, cobalt, iron, nickel or a mixture of two or more thereof may be pure or mixed oxides. Examples of magnetic oxides include without limitation iron oxides such as hematite ($Fe_2O_3$), magnetite ($Fe_3O_4$), chromium dioxide ($CrO_2$), magnetic ferrites ($MFe_2O_4$), magnetic spinels ($MR_2O_4$), magnetic hexaferrites ($MFe_2O_{19}$), magnetic orthoferrites ($RFeO_3$), magnetic garnets $M_3R_2(AO_4)_3$, wherein M stands for two-valent metal, R stands for three-valent metal, and A stands for four-valent metal.

Examples of magnetic or magnetizable pigment particles, in particular non-spherical magnetic or magnetizable pigment particles, described herein include without limitation pigment particles comprising a magnetic layer M made from one or more of a magnetic metal such as cobalt (Co), iron (Fe), gadolinium (Gd) or nickel (Ni); and a magnetic alloy of iron, cobalt or nickel, wherein said magnetic or magnetizable pigment particles may be multilayered structures comprising one or more additional layers. Preferably, the one or more additional layers are layers A independently made from one or more selected from the group consisting of metal fluorides such as magnesium fluoride ($MgF_2$), silicium oxide (SiO), silicium dioxide ($SiO_2$), titanium oxide ($TiO_2$), and aluminum oxide ($Al_2O_3$), more preferably silicium dioxide ($SiO_2$); or layers B independently made from one or more selected from the group consisting of metals and metal alloys, preferably selected from the group consisting of reflective metals and reflective metal alloys, and more preferably selected from the group consisting of aluminum (Al), chromium (Cr), and nickel (Ni), and still more preferably aluminum (Al); or a combination of one or more layers A such as those described hereabove and one or more layers B such as those described hereabove. Typical examples of the magnetic or magnetizable pigment particles being multilayered structures described hereabove include without limitation A/M multilayer structures, A/M/A multilayer structures, A/M/B multilayer structures, A/B/M/A multilayer structures, A/B/M/B multilayer structures, A/B/M/B/A/multilayer structures, B/M multilayer structures, B/M/B multilayer structures, B/A/M/A multilayer structures, B/A/M/B multilayer structures, B/A/M/B/A/multilayer structures, wherein the layers A, the magnetic layers M and the layers B are chosen from those described hereabove.

The coating composition described herein may comprise optically variable magnetic or magnetizable pigment particles, in particular non-spherical optically variable magnetic or magnetizable pigment particles, and/or non-spherical magnetic or magnetizable pigment particles, in particular non-spherical, having no optically variable properties. Preferably, at least a part of the magnetic or magnetizable pigment particles described herein is constituted by optically variable magnetic or magnetizable pigment particles, in particular non-spherical optically variable magnetic or magnetizable pigment particles. In addition to the overt security provided by the colorshifting property of the optically variable magnetic or magnetizable pigment particles, which allows easily detecting, recognizing and/or discriminating an article or security document carrying an ink, coating composition, or coating layer comprising the optically variable magnetic or magnetizable pigment particles described herein from their possible counterfeits using the unaided human senses, the optical properties of the optically variable magnetic or magnetizable pigment particles may also be used as a machine readable tool for the recognition of the OEL. Thus, the optical properties of the optically variable magnetic or magnetizable pigment particles may simultaneously be used as a covert or semi-covert security feature in an authentication process wherein the optical (e.g. spectral) properties of the pigment particles are analyzed.

The use of optically variable magnetic or magnetizable pigment particles, in particular optically variable magnetic or magnetizable pigment particles, in coating layers for producing an OEL enhances the significance of the OEL as a security feature in security document applications, because such materials are reserved to the security document printing industry and are not commercially available to the public.

As mentioned above, preferably at least a part of the magnetic or magnetizable pigment particles is constituted by optically variable magnetic or magnetizable pigment particles, in particular non-spherical optically variable magnetic or magnetizable pigment particles. These can more preferably be selected from the group consisting of magnetic thin-film interference pigment particles, magnetic cholesteric liquid crystal pigment particles, interference coated pigment particles comprising a magnetic material and mixtures of two or more thereof. The magnetic thin-film interference pigment particles, magnetic cholesteric liquid crystal pigment particles and interference coated pigment particles comprising a magnetic material described herein are preferably prolate or oblate ellipsoid-shaped, platelet-shaped or needle-shaped particles or a mixture of two or more thereof and more preferably platelet-shaped particles.

Magnetic thin film interference pigment particles are known to those skilled in the art and are disclosed e.g. in U.S. Pat. No. 4,838,648; WO 2002/073250 A2; EP 0 686 675 B1; WO 2003/000801 A2; U.S. Pat. No. 6,838,166; WO 2007/131833 A1; EP 2 402 401 A1 and in the documents cited therein. Preferably, the magnetic thin film interference pigment particles comprise pigment particles having a five-layer Fabry-Perot multilayer structure and/or pigment particles having a six-layer Fabry-Perot multilayer structure and/or pigment particles having a seven-layer Fabry-Perot multilayer structure.

Preferred five-layer Fabry-Perot multilayer structures consist of absorber/dielectric/reflector/dielectric/absorber multilayer structures wherein the reflector and/or the absorber is also a magnetic layer, preferably the reflector and/or the absorber is a magnetic layer comprising nickel, iron and/or cobalt, and/or a magnetic alloy comprising nickel, iron and/or cobalt and/or a magnetic oxide comprising nickel (Ni), iron (Fe) and/or cobalt (Co).

Preferred six-layer Fabry-Perot multilayer structures consist of absorber/dielectric/reflector/magnetic/dielectric/absorber multilayer structures.

Preferred seven-layer Fabry Perot multilayer structures consist of absorber/dielectric/eflector/magnetic/reflector/dielectric/absorber multilayer structures such as disclosed in U.S. Pat. No. 4,838,648.

Preferably, the reflector layers described herein are independently made from one or more selected from the group consisting of metals and metal alloys, preferably selected from the group consisting of reflective metals and reflective metal alloys, more preferably selected from the group consisting of aluminum (Al), silver (Ag), copper (Cu), gold (Au), platinum (Pt), tin (Sn), titanium (Ti), palladium (Pd), rhodium (Rh), niobium (Nb), chromium (Cr), nickel (Ni), and alloys thereof, even more preferably selected from the group consisting of aluminum (Al), chromium (Cr), nickel (Ni) and alloys thereof, and still more preferably aluminum (Al). Preferably, the dielectric layers are independently made from one or more selected from the group consisting of metal fluorides such as magnesium fluoride ($MgF_2$), aluminum fluoride ($AlF_3$), cerium fluoride ($CeF_3$), lanthanum fluoride ($LaF_3$), sodium aluminum fluorides (e.g. $Na_3AlF_6$), neodymium fluoride ($NdF_3$), samarium fluoride ($SmF_3$), barium fluoride ($BaF_2$), calcium fluoride ($CaF_2$), lithium fluoride (LiF), and metal oxides such as silicium oxide (SiO), silicium dioxide ($SiO_2$), titanium oxide ($TiO_2$), aluminum oxide ($Al_2O_3$), more preferably selected from the group consisting of magnesium fluoride ($MgF_2$) and silicium dioxide ($SiO_2$) and still more preferably magnesium fluoride ($MgF_2$). Preferably, the absorber layers are independently made from one or more selected from the group consisting of aluminum (Al), silver (Ag), copper (Cu), palladium (Pd), platinum (Pt), titanium (Ti), vanadium (V), iron (Fe) tin (Sn), tungsten (W), molybdenum (Mo), rhodium (Rh), Niobium (Nb), chromium (Cr), nickel (Ni), metal oxides thereof, metal sulfides thereof, metal carbides thereof, and metal alloys thereof, more preferably selected from the group consisting of chromium (Cr), nickel (Ni), metal oxides thereof, and metal alloys thereof, and still more preferably selected from the group consisting of chromium (Cr), nickel (Ni), and metal alloys thereof. Preferably, the magnetic layer comprises nickel (Ni), iron (Fe) and/or cobalt (Co); and/or a magnetic alloy comprising nickel (Ni), iron (Fe) and/or cobalt (Co); and/or a magnetic oxide comprising nickel (Ni), iron (Fe) and/or cobalt (Co). When magnetic thin film interference pigment particles comprising a seven-layer Fabry-Perot structure are preferred, it is particularly preferred that the magnetic thin film interference pigment particles comprise a seven-layer Fabry-Perot absorber/dielectric/reflector/magnetic/reflector/dielectric/absorber multilayer structure consisting of a $Cr/MgF_2/Al/Ni/Al/MgF_2/Cr$ multilayer structure.

The magnetic thin film interference pigment particles described herein may be multilayer pigment particles being considered as safe for human health and the environment and being based for example on five-layer Fabry-Perot multilayer structures, six-layer Fabry-Perot multilayer structures and seven-layer Fabry-Perot multilayer structures, wherein said pigment particles include one or more magnetic layers comprising a magnetic alloy having a substantially nickel-free composition including about 40 wt-% to about 90 wt-% iron, about 10 wt-% to about 50 wt-% chromium and about 0 wt-% to about 30 wt-% aluminum. Typical examples of multilayer pigment particles being considered as safe for human health and the environment can be found in EP 2 402 401 A1 which is hereby incorporated by reference in its entirety.

Magnetic thin film interference pigment particles described herein are typically manufactured by a conventional deposition technique of the different required layers onto a web. After deposition of the desired number of layers, e.g. by physical vapor deposition (PVD), chemical vapor deposition (CVD) or electrolytic deposition, the stack of layers is removed from the web, either by dissolving a release layer in a suitable solvent, or by stripping the material from the web. The so-obtained material is then broken down to flakes which have to be further processed by grinding, milling (such as for example jet milling processes) or any suitable method so as to obtain pigment particles of the required size. The resulting product consists of flat flakes with broken edges, irregular shapes and different aspect ratios. Further information on the preparation of suitable magnetic thin film interference pigment particles can be found e.g. in EP 1 710 756 A1 and EP 1 666 546 A1 which are hereby incorporated by reference.

Suitable magnetic cholesteric liquid crystal pigment particles exhibiting optically variable characteristics include without limitation magnetic monolayered cholesteric liquid crystal pigment particles and magnetic multilayered cholesteric liquid crystal pigment particles. Such pigment particles are disclosed for example in WO 2006/063926 A1, U.S. Pat. No. 6,582,781 and U.S. Pat. No. 6,531,221. WO 2006/063926 A1 discloses monolayers and pigment particles obtained therefrom with high brilliance and colorshifting properties with additional particular properties such as magnetizability. The disclosed monolayers and pigment particles, which are obtained therefrom by comminuting said monolayers, include a three-dimensionally crosslinked cholesteric liquid crystal mixture and magnetic nanoparticles. U.S. Pat. No. 6,582,781 and U.S. Pat. No. 6,410,130 disclose platelet-shaped cholesteric multilayer pigment particles which comprise the sequence A1/B/A2, wherein A1 and A2 may be identical or different and each comprises at least one cholesteric layer, and B is an interlayer absorbing all or some of the light transmitted by the layers A1 and A2 and imparting magnetic properties to said interlayer. U.S. Pat. No. 6,531,221 discloses platelet-shaped cholesteric multilayer pigment particles which comprise the sequence A/B and optionally C, wherein A and C are absorbing layers comprising pigment particles imparting magnetic properties, and B is a cholesteric layer.

Suitable interference coated pigments comprising one or more magnetic materials include without limitation structures consisting of a substrate selected from the group consisting of a core coated with one or more layers, wherein at least one of the core or the one or more layers have magnetic properties. For example, suitable interference coated pigments comprise a core made of a magnetic material such as those described hereabove, said core being coated with one or more layers made of one or more metal oxides, or they have a structure consisting of a core made of synthetic or natural micas, layered silicates (e.g. talc, kaolin and sericite), glasses (e.g. borosilicates), silicium dioxides ($SiO_2$), aluminum oxides ($Al_2O_3$), titanium oxides ($TiO_2$), graphites and mixtures of two or more thereof. Furthermore, one or more additional layers such as coloring layers may be present.

The magnetic or magnetizable pigment particles described herein may be surface treated so as to protect them against any deterioration that may occur in the coating composition and coating layer and/or to facilitate their incorporation in said coating composition and coating layer, typically corrosion inhibitor materials and/or wetting agents may be used.

The process described herein further comprises a step of exposing the coating layer described herein to the magnetic field of a magnetic-field-generating device, said magnetic-field-generating device being located on the side of the coating layer thereby orienting the plurality of magnetic or magnetizable pigment particles so as to follow a concave curvature when viewed from the side carrying the OEL, in particular a positive rolling bar feature.

Simultaneously or partially simultaneously with the step of exposing the coating layer to the magnetic field of a magnetic-field-generating device described herein, the coating layer described herein is hardened through the substrate to a second state so as to fix or freeze the magnetic or magnetizable pigment particles in their adopted positions and orientations so as to form a hardened coating, said hardening step being performed by irradiation with a UV-Vis irradiation source located on the side of the substrate.

The steps of simultaneously or partially simultaneously hardening the coating layer and exposing the coating layer to the magnetic field involves orienting the magnetic or magnetizable pigment particles by the magnetic field of the magnetic device in at least a part of the coating layer that is being hardened by irradiation of the UV-Vis radiation source at the same time. Put another way, the magnetic field of the magnetic device that is orienting the magnetic or magnetizable pigment particles in at least part of the coating layer overlaps in space and time with irradiation of the UV-Vis irradiation source, albeit from opposed sides of the substrate. In an embodiment, the magnetic field device and the UV-Vis radiation source are co-located along the substrate and disposed on opposite sides of the substrate.

The aforementioned first and second state can be provided by using a binder material that shows a great increase in viscosity in reaction to an exposure to an UV-Vis radiation. That is, when the fluid binder material is hardened, said binder material converts into the second state, i.e. a hardened or solid state, where the magnetic or magnetizable pigment particles are fixed in their current positions and orientations and can no longer move nor rotate within the binder material.

As known to those skilled in the art, ingredients comprised in a coating composition and coating layer obtained thereof on the substrate described herein and the physical properties of said coating layer are determined by the nature of the process used to transfer coating composition to the substrate. Consequently, the binder material described herein is typically chosen among those known in the art and depends on the coating or printing process used to apply the coating composition.

The binder of the coating compositions described herein is a UV-Vis hardenable composition preferably prepared from oligomers (also referred in the art as prepolymers) selected from the group consisting of radically hardenable compounds, cationically hardenable compounds and mixtures thereof. Cationically hardenable compounds are hardened by cationic mechanisms consisting of the activation by energy of one or more photoinitiators which liberate cationic species, such as acids, which in turn initiate the polymerization so as to form the binder. Radically hardenable compounds are cured by free radical mechanisms consisting of the activation by energy of one or more photoinitiators which liberate free radicals which in turn initiate the polymerization so as to form the binder.

UV-Vis hardening of a monomer, oligomer or prepolymer may require the presence of one or more photoinitiators and may be performed in a number of ways. As known by those skilled in the art, the one or more photoinitiators are selected according to their absorption spectra and are selected to fit with the emission spectra of the radiation source. Depending on the monomers, oligomers or prepolymers used to prepare the binder comprised in the UV-Vis-curable compositions described herein, different photoinitiators might be used. Suitable examples of free radical photoinitiators are known to those skilled in the art and include without limitation acetophenones, benzophenones, alpha-aminoketones, alpha-hydroxyketones, phosphine oxides and phosphine oxide derivatives and benzyldimethyl ketals. Suitable examples of cationic photoinitiators are known to those skilled in the art and include without limitation onium salts such as organic iodonium salts (e.g. diaryl iodoinium salts), oxonium (e.g. triaryloxonium salts) and sulfonium salts (e.g. triarylsulphonium salts). Other examples of useful photoinitiators can be found in standard textbooks such as "Chemistry & Technology of UV & EB Formulation for Coatings, Inks & Paints", Volume III, "Photoinitiators for Free Radical Cationic and Anionic Polymerization", 2nd edition, by J. V. Crivello & K. Dietliker, edited by G. Bradley and published in 1998 by John Wiley & Sons in association with SITA Technology Limited. It may also be advantageous to include a sensitizer in conjunction with the one or more photoinitiators in order to achieve efficient curing. Typical examples of suitable photosensitizers include without limitation isopropyl-thioxanthone (ITX), 1-chloro-2-propoxy-thioxanthone (CPTX), 2-chloro-thioxanthone (CTX) and 2,4-diethyl-thioxanthone (DETX) and mixtures thereof. The one or more photoinitiators comprised in the UV-Vis-curable compositions are preferably present in an amount from about 0.1 wt-% to about 20 wt-%, more preferably about 1 wt-% to about 15 wt-%, the weight percents being based on the total weight of the UV-Vis-curable compositions.

The plurality of magnetic or magnetizable pigment particles described herein are dispersed in the hardened coating described herein, said hardened coating comprising a hardened binder material that fixes the position and orientation of the magnetic or magnetizable pigment particles.

The coating compositions described herein may further comprise one or more machine readable materials. When present, the one or more machine readable materials are preferably selected from the group consisting of magnetic materials, luminescent materials, electrically conductive materials, infrared-absorbing materials and mixtures thereof. As used herein, the term "machine readable material" refers to a material which exhibits at least one distinctive property which is detectable by a device or a machine, and which can be comprised in a coating so as to confer a way to authenticate said coating or article comprising said coating by the use of a particular equipment for its detection and/or authentication.

The coating compositions described herein may further comprise one or more additives including without limitation compounds and materials which are used for adjusting physical, rheological and chemical parameters of the composition such as the viscosity (e.g. solvents and surfactants), the consistency (e.g. anti-settling agents, fillers and plasticizers), the foaming properties (e.g. antifoaming agents), the lubricating properties (waxes), UV reactivity and stability (photosensitizers and photostabilizers) and adhesion properties, etc. Additives described herein may be present in the coating compositions described herein in amounts and in forms known in the art, including in the form of so-called nano-materials where at least one of the dimensions of the particles is in the range of 1 to 1000 nm.

The coating composition described herein may further comprise one or more marker substances or taggants and/or one or more machine readable materials selected from the group consisting of magnetic materials (different from the magnetic or magnetizable pigment particles described herein), luminescent materials, electrically conductive materials and infrared-absorbing materials. As used herein, the term "machine readable material" refers to a material which exhibits at least one distinctive property which is not perceptible by the naked eye, and which can be comprised in a layer so as to confer a way to authenticate said layer or article comprising said layer by the use of a particular equipment for its authentication.

The coating compositions described herein may be prepared by dispersing or mixing the magnetic or magnetizable pigment particles described herein and the one or more additives when present in the presence of the binder material described herein, thus forming liquid compositions. When present, the one or more photoinitiators may be added to the composition either during the dispersing or mixing step of all other ingredients or may be added at a later stage, i.e. after the formation of the liquid coating composition.

Figure 5B:
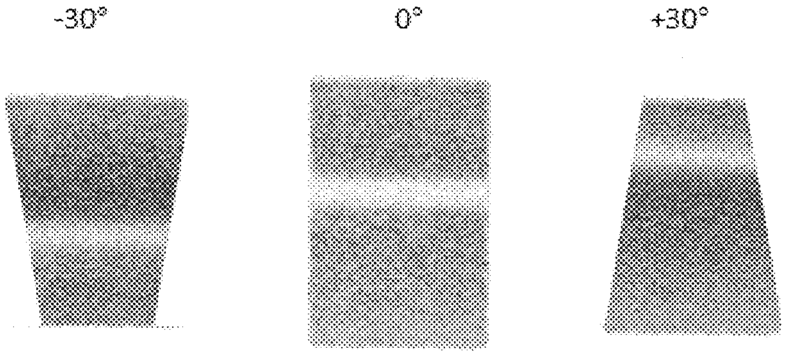
FIG. 5B shows an example of a rolling bar feature produced by using the process illustrated in FIG. 5A as seen under different viewing angles.

According to one embodiment of the present invention and as shown in FIG. 5A, an OEL based on a plurality of magnetic or magnetizable pigment particles oriented so as to follow a concave curvature when viewed from the side carrying the coating layer (C), in particular an OEL exhibiting a positive rolling bar feature, may be produced by orienting the magnetic or magnetizable pigment particles in the coating layer (C) with a magnetic-field generating device (MD) located on the side carrying the coating layer (C), and simultaneously or partially simultaneously to the orienting step with the magnetic-field generating device, hardening through the substrate (S) the coating layer (C) by irradiation with a UV-Vis irradiation source (L) located on the side of the substrate (S), i.e. the side opposite to the substrate surface carrying the coating layer (C). The substrate (S) may be located on an optional supporting plate (K). When present, the supporting plate (K) is made of a non-magnetic or non-magnetizable material that is transparent to the UV-Vis irradiation used for the hardening step. The hardening step is thus performed by irradiation through the substrate (S) and through the optional supporting plate (K). The substrate (S) carrying the coating layer (C) is placed on a magnetic-field generating device (MD) comprising a magnet (M) and a magnetic device housing (K') comprising a recess on its surface such that when the magnetic-field generating device (MD) is located on the substrate (S), it does not come into contact with the surface of the coating layer (C). Depending on the arrangement, the magnetic-field generating device (MD), the substrate (S) carrying the coating layer (C) and the irradiation source (L) may be located as illustrated in FIG. 5A left (magnetic-field generating device (MD) above the substrate (S) and the optional supporting plate (K)) or in FIG. 5A right (magnetic-field generating device (MD) below the substrate (S) carrying the coating composition (C) on its lower surface, here shown without the optional supporting plate (K)). FIG. 5B shows an example of a positive rolling bar feature produced according to the method illustrated in FIG. 5A right. As shown in FIG. 5B, the OEL comprising a rolling bar feature produced with this method displays better defined rolling bar effect as compared to FIG. 4B, i.e. a strong eye-catching dynamic apparent movement when viewed under different angles.

The magnetic-field-generating device described herein may comprise a magnetic plate carrying surface one or more reliefs, engravings or cut-outs. WO 2005/002866 A1 and WO 2008/046702 A1 disclose examples for such engraved magnetic plates.

Figure 6A:
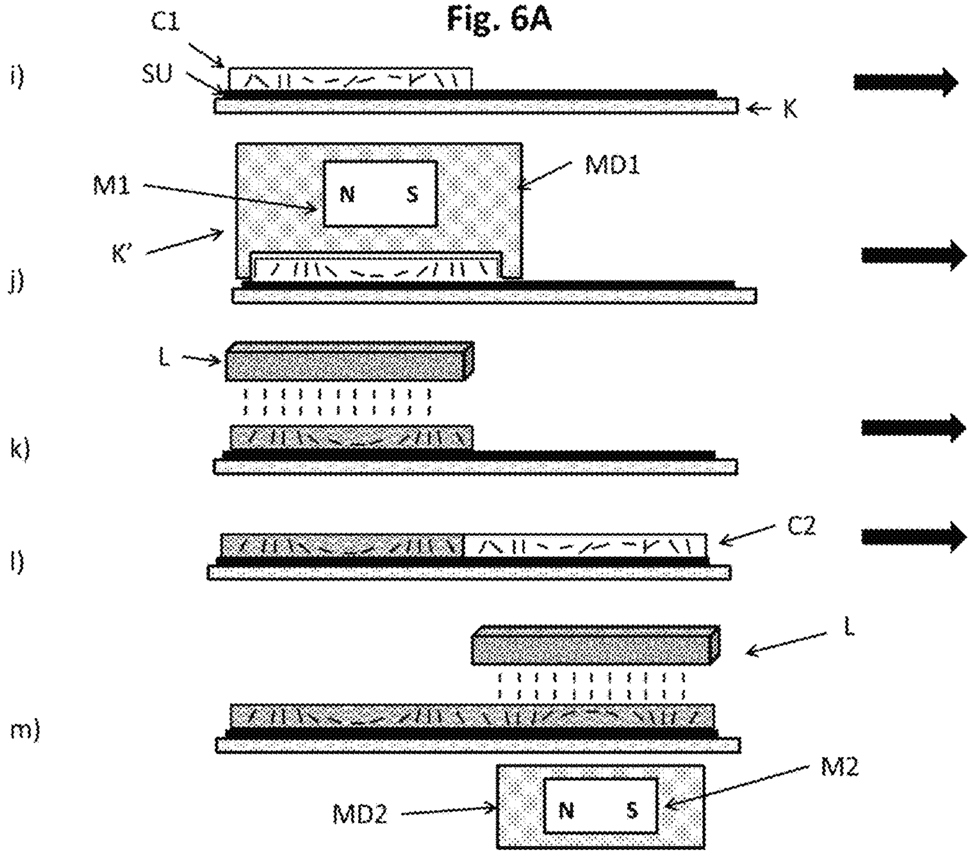
FIG. 6A illustrates a comparative an example of a process using a magnetic-field generating device and irradiation source suitable for forming an optical effect layer comprising a motif made of at least two patterns, wherein one of said at least two patterns is based on a plurality of magnetic or magnetizable pigment particles oriented so as to follow a concave curvature when viewed from the side carrying the OEL and another of said at least two patterns is based on a plurality of magnetic or magnetizable pigment particles oriented so as to follow a convex curvature when viewed from the side carrying the OEL (prior art).

The present invention further provides optical effect layers (OEL) comprising a motif made of at least two patterns, wherein one of said at least two patterns is based on a plurality of magnetic or magnetizable pigment particles oriented so as to follow a concave curvature when viewed from the side carrying the OEL, in particular a positive rolling bar feature, and another of said at least two patterns is based on a plurality of magnetic or magnetizable pigment particles oriented in any pattern except a random orientation are highly appreciated in the field of security. FIG. 6A illustrates a process for making those OELs according to the prior art. Known processes for preparing those OELs comprises the steps of: i) applying a coating composition comprising magnetic or magnetizable pigment particles on a substrate (S) so as to form a coating layer (C1); j) orienting the magnetic or magnetizable pigment particles in the coating layer (C1) with a magnetic-field-generating device located on the side carrying the coating layer (C1); k) subsequently to the removal of the magnetic-field-generating device, hardening the coating layer (C1) by irradiating it with a UV-Vis irradiation source located on the side carrying the coating layer (C1); l) applying a second coating composition comprising magnetic or magnetizable pigment particles so as to form a second coating layer (C2) in an area adjacent to (C1); m) orienting the magnetic or magnetizable pigment particles in the second coating layer (C2) with a magnetic-field-generating device located on the side of the substrate and simultaneously or partially simultaneously hardening the second coating layer (C2) by irradiating it with a UV-Vis irradiation source located on the substrate side carrying the second coating layer (C2).

Figure 6B:
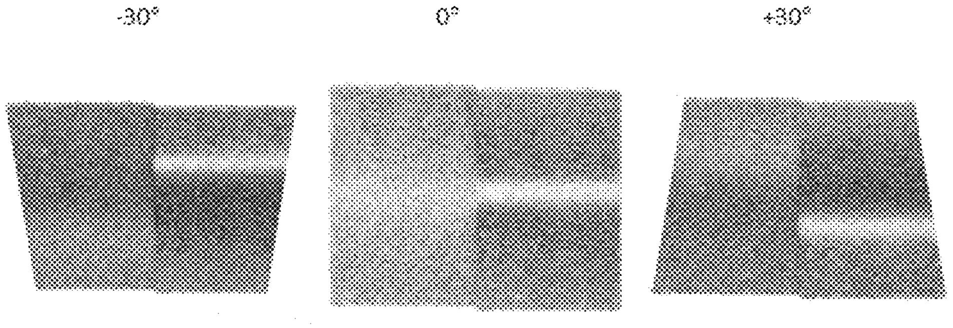
FIG. 6B shows an example of a rolling bar feature produced by using the process illustrated in FIG. 6B as seen under different viewing angles.

FIG. 6B shows an example of an OEL produced according to the process illustrated in FIG. 6A. As illustrated in FIG. 6B, the positive rolling bar effect (left side of the OEL) and the negative rolling bar effect (right side of the OEL) are clearly different: the negative rolling bar feature is produced by hardening the coating layer while it is in the magnetic field of the magnetic-field-generating device, whereas the positive rolling bar feature is produced by hardening the coating layer while it is not in the magnetic field of the magnetic-field-generating device. As illustrated in FIG. 6B, the positive rolling bar effect (left side) exhibits a much broader bright band and a poorer and much less eye-catching effect as the negative rolling bar feature (right side).

The present invention further provides a process for producing an optical effect layer (OEL) comprising a motif made of at least two patterns, wherein one of said at least two patterns is based on a plurality of magnetic or magnetizable pigment particles oriented so as to follow a concave curvature when viewed from the side carrying OEL, in particular a positive rolling bar feature, and another of said at least two patterns is based on a plurality of magnetic or magnetizable pigment particles oriented in any pattern except a random orientation, preferably oriented so as to follow a convex curvature when viewed from the side carrying the OEL, in particular a negative rolling bar feature. The at least two patterns described herein may be spaced apart or may be adjacent.

Preferably, the present invention further provides a process for producing an optical effect layer (OEL) comprising a motif made of at least two adjacent patterns, wherein one of said at least two adjacent patterns is based on a plurality of magnetic or magnetizable pigment particles oriented so as to follow a concave curvature when viewed from the side carrying the OEL, in particular a positive rolling bar feature, and another of said at least two adjacent patterns is based on a plurality of magnetic or magnetizable pigment particles oriented in any pattern except a random orientation, preferably oriented so as to follow a convex curvature when viewed from the side carrying the OEL, in particular a negative rolling bar feature. The desired orientation of the plurality of magnetic or magnetizable pigment particles of the another of said at least two adjacent patterns is chosen according to the end-use applications. Examples of any pattern except a random orientation include without limitation rolling bar features, flip-flop effects (also referred in the art as switching effect), Venetian-blind effects, moving-ring effects. Flip-flop effects include a first printed portion and a second printed portion separated by a transition, wherein pigment particles are aligned parallel to a first plane in the first portion and pigment particles in the second portion are aligned parallel to a second plane. Methods for producing flip-flop effects are disclosed for example in EP 1 819 525 B1 and EP 1 819 525 B1. Venetian-blind effects may also be produced. Venetian-blind effects include pigment particles being oriented such that, along a specific direction of observation, they give visibility to an underlying substrate surface, such that indicia or other features present on or in the substrate surface become apparent to the observer, while they impede the visibility along another direction of observation. Methods for producing Venetian-blind effects are disclosed for example in U.S. Pat. No. 8,025,952 and EP 1 819 525 B1. Moving-ring effects consists of optically illusive images of objects such as funnels, cones, bowls, circles, ellipses, and hemispheres that appear to move in any x-y direction depending upon the angle of tilt of said optical effect layer. Methods for producing moving-ring effects are disclosed for example in EP 1 710 756 A1, U.S. Pat. No. 8,343,615, EP 2 306 222 A1, EP 2 325 677 A2, WO 2011/092502 A2 and US 2013/084411.

The plurality of magnetic or magnetizable pigment particles of said at least two patterns may also be produced by using a first and/or second magnetic-field-generating devices comprising a magnetic plate carrying surface one or more reliefs, engravings or cut-outs. WO 2005/002866 A1 and WO 2008/046702 A1 are examples for such engraved magnetic plates.

The process for producing an optical effect layer (OEL) comprising a motif made of at least two patterns, preferably at least two adjacent patterns, wherein one of said at least two patterns is based on a plurality of magnetic or magnetizable pigment particles oriented so as to follow a concave curvature when viewed from the side carrying the OEL, in particular a positive rolling bar feature, and another of said at least two patterns is based on a plurality of magnetic or magnetizable pigment particles oriented in any pattern except a random orientation, preferably oriented so as to follow a convex curvature when viewed from the side carrying the OEL, comprises the steps of:

a) applying, preferably by a printing process selected from the group consisting of screen printing, rotogravure printing and flexography printing, on the substrate described herein the coating composition described herein so as to form a coating layer, said coating layer being in a first state as described herein;

b) b1) exposing the coating layer to the magnetic field of a first magnetic-field-generating device, said magnetic-field-generating device being located on the side of the coating layer thereby orienting the plurality of magnetic or magnetizable pigment particles so as to follow a concave curvature when viewed from the side carrying the coating layer, as described herein, and b2) simultaneously or partially simultaneously hardening through the substrate the coating layer as described herein, said hardening being performed by irradiation with a UV-Vis irradiation source located on the side of the substrate, as described herein;

c) applying, preferably by a printing process selected from the group consisting of screen printing, rotogravure printing and flexography printing, a second coating composition comprising a plurality of magnetic or magnetizable pigment particles so as to form a second coating layer, said coating layer being in a first state, wherein said second coating composition may be the same as the one used under step a) or may be different and wherein the plurality of magnetic or magnetizable pigment particles may be the same as the one used under step a) or may be different;

d) exposing the second coating layer in a first state to the magnetic field of a second magnetic-field-generating device thereby orienting the plurality of magnetic or magnetizable pigment particles in any pattern except a random orientation, preferably thereby orienting the plurality of magnetic or magnetizable pigment particles so as to follow a convex curvature when viewed from the side carrying the coating layer, and e) hardening by UV-Vis radiation the second coating layer to a second state so as to fix the magnetic or magnetizable pigment particles in their adopted positions and orientations.

The step e) of hardening the second coating layer may be partially simultaneously, simultaneously or subsequently, preferably partially simultaneously or simultaneously, performed with the step d) (i.e. the magnetic orientation of the magnetic or magnetizable pigment particles).

Alternatively, the steps of the process described hereabove may be interchanged, i.e. said process may further comprises the steps of i) applying a second coating composition layer comprising a plurality of magnetic or magnetizable pigment particles so as to form a second coating layer, said coating composition being in a first state; ii) of exposing the second coating layer in a first state to the magnetic field of a second magnetic-field-generating device thereby orienting the plurality of magnetic or magnetizable pigment particles in any pattern except a random orientation, preferably thereby orienting the plurality of magnetic or magnetizable pigment particles so as to follow a concave curvature when viewed from the side carrying the coating layer; and iii) simultaneously, partially simultaneously or subsequently, preferably simultaneously or partially simultaneously, preferably simultaneously partially or partially simultaneously, hardening by UV-Vis radiation the second coating layer to a second state so as to fix the magnetic or magnetizable pigment particles in their adopted positions and orientations, wherein said steps are carried out before the steps a) and b), in other words, said process comprises the steps of:

a) applying, preferably by a printing process selected from the group consisting of screen printing, rotogravure printing and flexography printing, on the substrate described herein the coating composition described herein so as to form a coating layer, said coating layer being in a first state as described herein;

b) b1) exposing the coating layer to the magnetic field of a first magnetic-field-generating device thereby orienting the plurality of magnetic or magnetizable pigment particles in any pattern except a random orientation, preferably thereby orienting the plurality of magnetic or magnetizable pigment particles so as to follow a convex curvature when viewed from the side carrying the coating layer, and b2) hardening the coating layer, said hardening being performed by irradiation with a UV-Vis irradiation source;

c) applying, preferably by a printing process selected from the group consisting of screen printing, rotogravure printing and flexography printing, a second coating composition comprising a plurality of magnetic or magnetizable pigment particles, such as those described herein and being able to be hardened through the substrate, so as to form a second coating layer, said coating layer being in a first state, wherein said second coating composition may be the same as the one used under step a) or may be different and wherein the plurality of magnetic or magnetizable pigment particles may be the same as the one used under step a) or may be different;

d) exposing the second coating layer in a first state to the magnetic field of a second magnetic-field-generating device said magnetic-field-generating device being located on the side of the coating layer thereby orienting the plurality of magnetic or magnetizable pigment particles so as to follow a concave curvature when viewed from the side carrying the coating layer, as described herein; and e) simultaneously or partially simultaneously hardening through the substrate the coating layer as described herein, said hardening being performed by irradiation with a UV-Vis irradiation source located on the side of the substrate, as described herein.

The step b2) of hardening the first coating layer may be may be partially simultaneously, simultaneously or subsequently, preferably partially simultaneously or simultaneously, with the step d) (i.e. the magnetic orientation of the magnetic or magnetizable pigment particles).

According to one embodiment, the second magnetic field generating device described herein is located on the substrate side and the UV-Vis irradiation source for the UV-Vis radiation being applied to the second coating composition is located on the coating layer side.

According to a preferred embodiment, the present invention provides a process for producing an optical effect layer (OEL) comprising a motif made of at least two patterns, preferably at least two adjacent patterns, wherein one of said at least two patterns is based on a plurality of magnetic or magnetizable pigment particles oriented so as to follow a concave curvature when viewed from the side carrying the OEL, in particular a positive rolling bar feature, and another of said at least two patterns is based on a plurality of magnetic or magnetizable pigment particles oriented so as to follow a convex curvature when viewed from the side carrying the OEL, in particular a negative rolling bar feature.

Figure 7A:
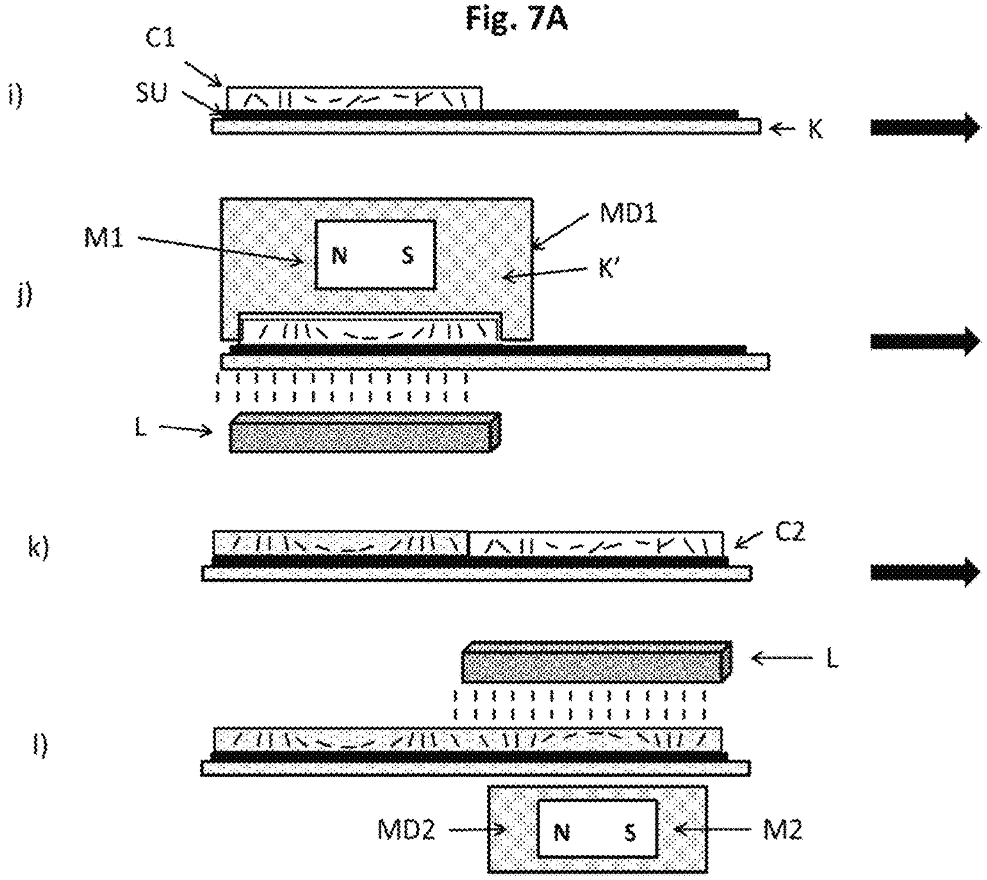
FIG. 7A schematically illustrates an example according to the present invention of a process using a magnetic-field generating device and irradiation source suitable for forming an optical effect layer comprising a motif made of at least two patterns, wherein one of said at least two patterns is based on a plurality of magnetic or magnetizable pigment particles oriented so as to follow a concave curvature when viewed from the side carrying the OEL and another of said at least two patterns is based on a plurality of magnetic or magnetizable pigment particles oriented so as to follow a convex curvature when viewed from the side carrying the OEL.

FIG. 7A shows a preferred example of a process for producing an optical effect layer (OEL) comprising a motif made of at least two patterns, in particular two adjacent patterns, wherein one of said at least two patterns is based on a plurality of magnetic or magnetizable pigment particles oriented so as to follow a concave curvature when viewed from the side carrying the coating layer (C1), in particular a positive rolling bar feature, and another of said at least two patterns is based on a plurality of magnetic or magnetizable pigment particles oriented so as to follow a convex curvature when viewed from the side carrying the coating layer (C2), in particular a negative rolling bar feature, said process comprising the steps of:

i) applying, preferably by a printing process selected from the group consisting of screen printing, rotogravure printing and flexography printing, on the substrate (S) described herein the coating composition described herein so as to form a coating layer (C1) described herein, as described herein;

j) exposing the coating layer (C1) to the magnetic field of a first magnetic-field-generating device (MD1), said magnetic-field-generating device (MD1) being located on the side of the coating layer (C1) thereby orienting the plurality of magnetic or magnetizable pigment particles so as to follow a concave curvature when viewed from the side carrying the coating layer (C1), as described herein, and) simultaneously or partially simultaneously hardening through the substrate (S) the coating layer (C1) as described herein, said hardening being performed by irradiation with a UV-Vis irradiation source (L) located on the side of the substrate, as described herein;

k) applying, preferably by a printing process selected from the group consisting of screen printing, rotogravure printing and flexography printing, a second coating composition comprising a plurality of magnetic or magnetizable pigment particles so as to form a second coating layer (C2), said second coating layer being in a first state, wherein said second coating composition may be the same as the one used under step i) or may be different and wherein the plurality of magnetic or magnetizable pigment particles may be the same as the one used under step i) or may be different; and l) exposing the second coating layer (C2) in a first state to the magnetic field of a second magnetic-field-generating device (MD2), said magnetic-field-generating device (MD2) being located on the side of substrate (S) thereby orienting the plurality of magnetic or magnetizable pigment particles so as to follow a convex curvature when viewed from the side carrying the coating layer; and simultaneously or at least partially simultaneously hardening by UV-Vis radiation (L) the second coating layer (C2) to a second state so as to fix the magnetic or magnetizable pigment particles in their adopted positions and orientations.

Figure 7B:
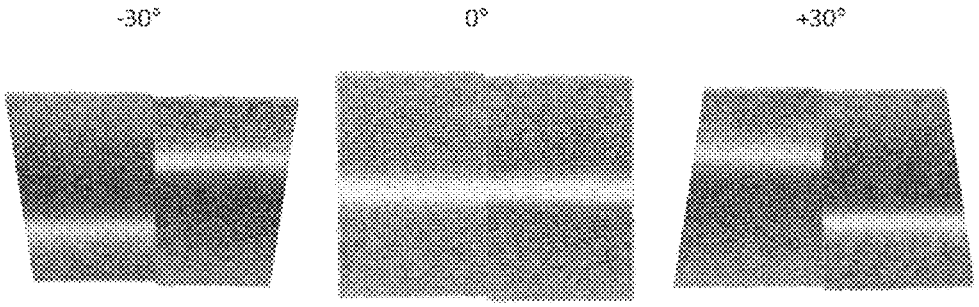
FIG. 7B shows an example of a rolling bar feature produced by using the process illustrated in FIG. 7A as seen under different viewing angles.

FIG. 7B shows an example of an optical effect layer (OEL) comprising a motif made of at least adjacent two patterns, wherein one of said at least two adjacent patterns is based on a plurality of magnetic or magnetizable pigment particles oriented so as to follow a concave curvature when viewed from the side carrying the OEL, in particular a positive rolling bar feature, and another of said at least two adjacent patterns is based on a plurality of magnetic or magnetizable pigment particles oriented so as to follow a convex curvature when viewed from the side carrying the OEL, said OEL being obtained by the process illustrated in FIG. 7A. As shown in FIG. 7B, the positive rolling bar feature (left side of the OEL) and the negative rolling bar feature (right side of the OEL) display identical brightness and width. Both the negative rolling bar feature and the positive rolling bar feature are produced by using a magnetic-field-generating device producing convex magnetic field lines being located either above the substrate (concave effect) or below the substrate (convex effect) and by simultaneously or partially simultaneously hardening the coating layer while it is located in the magnetic field.

According to a preferred embodiment, the present invention provides a process for producing an optical effect layer (OEL) comprising a motif made of a first pattern, a second pattern and a third pattern, wherein the first pattern is based on a plurality of magnetic or magnetizable pigment particles oriented so as to follow a concave curvature when viewed from the side carrying the OEL, in particular a positive rolling bar feature, the second pattern is based on a plurality of magnetic or magnetizable pigment particles oriented so as to follow a convex curvature when viewed from the side carrying the OEL, in particular a negative rolling bar feature, and the third pattern is based on a plurality of magnetic or magnetizable pigment particles oriented so as to follow a concave curvature (in particular a positive rolling bar feature), or a convex curvature, (in particular a negative rolling bar feature) when viewed from the side carrying the OEL, preferably a convex curvature, (in particular a negative rolling bar feature) when viewed from the side carrying the OEL, wherein the first pattern is located between said second and third patterns and is adjacent to the second and third patterns. According to one embodiment, the process described herein produces an optical effect layer (OEL) comprising a motif made of a first pattern, a second pattern and a third pattern, wherein the first pattern exhibits a positive rolling bar feature, the second pattern exhibits a negative rolling bar feature and the third pattern exhibits either a positive rolling bar feature or a negative rolling bar feature, preferably a negative rolling bar, wherein the first pattern is located between said second and third patterns and is adjacent to the second and third patterns (also known in the art as triple rolling bar feature).

According to a preferred embodiment, the present invention provides a process for producing an optical effect layer (OEL) comprising a motif made of a first pattern, a second pattern and a third pattern, wherein the first pattern is based on a plurality of magnetic or magnetizable pigment particles oriented so as to follow a convex curvature when viewed from the side carrying the OEL, in particular a negative rolling bar feature, the second pattern is based on a plurality of magnetic or magnetizable pigment particles oriented so as to follow a concave curvature when viewed from the side carrying the OEL, in particular a positive rolling bar feature, and the third pattern is based on a plurality of magnetic or magnetizable pigment particles oriented so as to follow a concave curvature (in particular a positive rolling bar feature), or a convex curvature, (in particular a negative rolling bar feature), preferably a concave curvature (in particular a positive rolling bar feature), when viewed from the side carrying the OEL, wherein the first pattern is located between said second and third patterns and is adjacent to the second and third patterns. According to another embodiment, the process described herein produces an optical effect layer (OEL) comprising a motif made of a first pattern, a second pattern and a third pattern, wherein the first pattern exhibits a negative rolling bar feature, the second pattern exhibits a positive rolling bar feature and the third pattern exhibits either a positive rolling bar feature or a negative rolling bar feature, preferably a positive rolling bar feature, wherein the first pattern is located between said second and third patterns and is adjacent to the second and third patterns (also known in the art as triple rolling bar feature).

The present invention further provides a process for producing an optical effect layer (OEL) comprising a motif made of at least two adjacent patterns made of a single hardened layer, wherein one of said at least two adjacent patterns is based on a plurality of magnetic or magnetizable pigment particles oriented so as to follow a concave curvature when viewed from the side carrying the OEL, in particular a positive rolling bar feature and another of said at least two adjacent patterns is based on a plurality of magnetic or magnetizable pigment particles oriented in any pattern except a random orientation. The process for producing an optical effect layer (OEL) comprising a motif made of at least two adjacent patterns made of a single hardened layer comprises the steps of:

a) applying, preferably by a printing process selected from the group consisting of screen printing, rotogravure printing and flexography printing, on the substrate described herein the coating layer composition described herein so as to form a coating layer, said coating layer being in a first state, as described herein;

b) b1) exposing one or more first substrate areas carrying the coating layer to the magnetic field of a first magnetic-field-generating device, said magnetic-field-generating device being located on the side of the coating layer thereby orienting the plurality of magnetic or magnetizable pigment particles so as to follow a concave curvature when viewed from the side carrying the coating layer, as described herein, and b2) simultaneously or partially simultaneously hardening through the substrate the coating layer, said hardening being performed by irradiation with a UV-Vis irradiation source located on the side of the substrate, as described herein; wherein said UV-Vis irradiation source is equipped with a photomask such that one or more second substrate areas carrying the coating layer are not exposed to the UV-Vis irradiation; and c) exposing at least the one or more second substrate areas carrying the coating layer which are still in a first state due to the presence of the photomask under step b2) to the magnetic field of a second magnetic-field-generating device thereby orienting the plurality of magnetic or magnetizable pigment particles so as to follow any orientation except a random orientation; and simultaneously, partially simultaneously or subsequently, preferably simultaneously or partially simultaneously, hardening by irradiation with a UV-Vis irradiation source at least the one or more second substrate areas carrying the coating layer to a second state so as to fix the magnetic or magnetizable pigment particles in their adopted positions and orientations.

Alternatively, the steps of the process described hereabove may be interchanged, i.e. said process may comprises the steps of:

a) applying, preferably by a printing process selected from the group consisting of screen printing, rotogravure printing and flexography printing, on the substrate described herein the coating layer composition described herein so as to form a coating layer, said coating layer being in a first state, as described herein;

b) b1) exposing one or more first substrate areas carrying the coating layer to the magnetic field of a first magnetic-field-generating device, thereby orienting the plurality of magnetic or magnetizable pigment particles so as to follow any orientation except a random orientation, and b2) and simultaneously, partially simultaneously or subsequently, preferably simultaneously or partially simultaneously, hardening the coating layer, said hardening being performed by irradiation with a UV-Vis irradiation source equipped with a photomask such that one or more second substrate areas carrying the coating layer are not exposed to the UV-Vis irradiation; and c) exposing at least the one or more second substrate areas carrying the coating layer which are still in a first state due to the presence of the photomask under step b2) to the magnetic field of a second magnetic-field-generating device, said magnetic-field-generating device being located on the side of the coating layer thereby orienting the plurality of magnetic or magnetizable pigment particles so as to follow a concave curvature when viewed from the side carrying the coating layer, as described herein; and simultaneously or partially simultaneously hardening by irradiation with a UV-Vis irradiation source located on the side of the substrate at least the one or more second substrate areas carrying the coating layer to a second state so as to fix the magnetic or magnetizable pigment particles in their adopted positions and orientations.

The present invention further provides a process for producing an optical effect layer (OEL) comprising a motif made of at least two adjacent patterns made of a single hardened layer, wherein both of said at least two adjacent patterns are based on a plurality of magnetic or magnetizable pigment particles oriented so as to follow a concave curvature when viewed from the side carrying the OEL, in particular a positive rolling bar feature. The process for producing an optical effect layer (OEL) comprising a motif made of at least two adjacent patterns made of a single hardened layer comprises the steps of:

a) applying, preferably by a printing process selected from the group consisting of screen printing, rotogravure printing and flexography printing, on the substrate described herein the coating layer composition described herein so as to form a coating layer, said coating layer being in a first state, as described herein;

b) b1) exposing one or more first substrate areas carrying the coating layer to the magnetic field of a first magnetic-field-generating device, said magnetic-field-generating device being located on the side of the coating layer thereby orienting the plurality of magnetic or magnetizable pigment particles so as to follow a concave curvature when viewed from the side carrying the coating layer, as described herein, and b2) simultaneously or partially simultaneously hardening through the substrate the coating layer, said hardening being performed by irradiation with a UV-Vis irradiation source located on the side of the substrate, as described herein; wherein said UV-Vis irradiation source is equipped with a photomask such that one or more second substrate areas carrying the coating layer are not exposed to the UV-Vis irradiation; and c) exposing at least the one or more second substrate areas carrying the coating layer which are still in a first state due to the presence of the photomask under step b2) to the magnetic field of a second magnetic-field-generating device, said magnetic-field-generating device being located on the side of the coating layer thereby orienting the plurality of magnetic or magnetizable pigment particles so as to follow a concave curvature when viewed from the side carrying the coating layer, as described herein; and simultaneously or partially simultaneously hardening by irradiation with a UV-Vis irradiation source at least the one or more second substrate areas carrying the coating layer to a second state so as to fix the magnetic or magnetizable pigment particles in their adopted positions and orientations, wherein the concave curvature obtained under step b1) is different from the concave curvature obtained under step c).

Preferably, the present invention further provides a process for producing an optical effect layer (OEL) comprising a motif made of at least two adjacent patterns made of a single hardened layer, wherein one of said at least two adjacent patterns is based on a plurality of magnetic or magnetizable pigment particles oriented so as to follow a concave curvature when viewed from the side carrying the OEL, in particular a positive rolling bar feature, and another of said at least two adjacent patterns is based on a plurality of magnetic or magnetizable pigment particles oriented so as to follow a convex curvature when viewed from the side carrying the OEL. The process for producing an optical effect layer (OEL) comprising a motif made of at least two adjacent patterns made of a single hardened layer comprises the steps of:

a) applying, preferably by a printing process selected from the group consisting of screen printing, rotogravure printing and flexography printing, on the substrate described herein the coating layer composition described herein so as to form a coating layer, said coating layer being in a first state, as described herein;

b) b1) exposing one or more first substrate areas carrying the coating layer to the magnetic field of a first magnetic-field-generating device, said magnetic-field-generating device being located on the side of the coating layer thereby orienting the plurality of magnetic or magnetizable pigment particles so as to follow a concave curvature when viewed from the side carrying the coating layer, as described herein, and b2) simultaneously or partially simultaneously hardening through the substrate the coating layer, said hardening being performed by irradiation with a UV-Vis irradiation source located on the side of the substrate, as described herein; wherein said UV-Vis irradiation source is equipped with a photomask such that one or more second substrate areas carrying the coating layer are not exposed to UV-Vis irradiation; and c) exposing at least the one or more second substrate areas carrying the coating layer which are still in a first state due to the presence of the photomask under step b2) to the magnetic field of a second magnetic-field-generating device, said magnetic-field-generating device being located on the side of substrate thereby orienting the plurality of magnetic or magnetizable pigment particles so as to follow a convex curvature when viewed from the side carrying the coating layer; and simultaneously or partially simultaneously hardening by irradiation with a UV-Vis irradiation source at least the one or more second substrate areas carrying the coating layer to a second state so as to fix the magnetic or magnetizable pigment particles in their adopted positions and orientations.

Alternatively, the steps of the process described hereabove may be interchanged, i.e. said process may comprises the steps of:

a) applying, preferably by a printing process selected from the group consisting of screen printing, rotogravure printing and flexography printing, on the substrate described herein the coating layer composition described herein so as to form a coating layer, said coating layer being in a first state, as described herein;

b) b1) exposing one or more first substrate areas carrying the coating layer to the magnetic field of a first magnetic-field-generating device, said magnetic-field-generating device being located on the side of substrate thereby orienting the plurality of magnetic or magnetizable pigment particles so as to follow a convex curvature when viewed from the side carrying the coating layer, and b2) simultaneously or partially simultaneously hardening the coating layer, said hardening being performed by irradiation with a UV-Vis irradiation source equipped with a photomask such that one or more second substrate areas carrying the coating layer are not exposed to UV-Vis irradiation; and c) exposing at least the one or more second substrate areas carrying the coating layer which are still in a first state due to the presence of the photomask under step b2) to the magnetic field of a second magnetic-field-generating device, said magnetic-field-generating device being located on the side of the coating layer thereby orienting the plurality of magnetic or magnetizable pigment particles so as to follow a concave curvature when viewed from the side carrying the coating layer, as described herein; and simultaneously or partially simultaneously hardening through the substrate at least the one or more second substrate areas carrying the coating layer to a second state so as to fix the magnetic or magnetizable pigment particles in their adopted positions and orientations, said hardening being performed by irradiation with a UV-Vis irradiation source located on the side of the substrate, as described herein.

Figure 8:
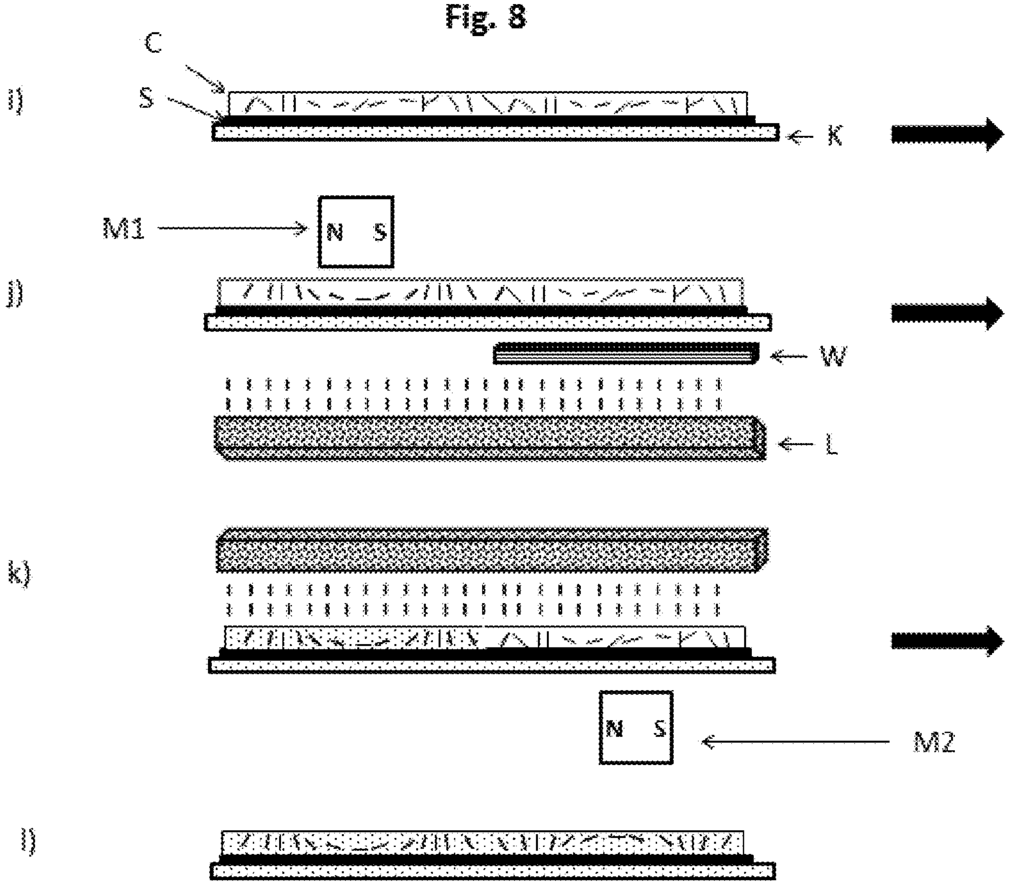
FIG. 8 schematically illustrates an example according to the present invention of a process using a magnetic-field generating device and irradiation source suitable for forming an optical effect layer comprising a motif made of at least two adjacent patterns made of a single hardened layer, wherein one of said at least two patterns is based on a plurality of magnetic or magnetizable pigment particles oriented so as to follow a concave curvature when viewed from the side carrying the OEL and another of said at least two patterns is based on a plurality of magnetic or magnetizable pigment particles oriented so as to follow a convex curvature when viewed from the side carrying the OEL.

FIG. 8 schematically illustrates a process for making an optical effect layer (OEL) comprising a motif made of two adjacent patterns made of a single hardened layer, wherein one of said two adjacent patterns is based on a plurality of magnetic or magnetizable pigment particles oriented so as to follow a concave curvature when viewed from the side carrying the OEL, in particular a positive rolling bar feature, and the other of said two adjacent patterns is based on a plurality of magnetic or magnetizable pigment particles oriented so as to follow a convex curvature when viewed from the side carrying OEL, in particular a negative rolling bar feature, as described herein. Said process comprises the steps of i) applying a coating composition comprising magnetic or magnetizable pigment particles on a substrate (S) so as to form a coating layer (C); j) orienting the magnetic or magnetizable pigment particles in the coating layer (C) with a magnetic-field-generating device (M) located on the side carrying the coating layer (C) while simultaneously hardening through the substrate (S) the coating layer (C), said hardening being performed by irradiation with a UV-Vis irradiation source (L) located on the side of the substrate (S), wherein said UV-Vis irradiation source (L) is equipped with a photomask (W);

k) exposing the coating layer to the magnetic field of a second magnetic-field-generating device (M2), said magnetic-field-generating device being located on the side of substrate (S) thereby orienting the plurality of magnetic or magnetizable pigment particles so as to follow a convex curvature when viewed from the side carrying the hardened coating; and simultaneously hardening by irradiation with a UV-Vis irradiation source (L) the coating layer to a second state so as to fix the magnetic or magnetizable pigment particles in their adopted positions and orientations.

The use of the UV-Vis irradiation source equipped with a photomask allows to selectively hardening the coating composition in one or more selected areas. A photomask consists of an opaque plate comprising holes or transparent areas that allow light to shine through in a defined pattern. Photomasks are commonly used for example in photolithography. According to one embodiment of the present invention, the photomask may be located in a fixed location between the irradiation source and the substrate carrying the coating layer to be hardened. According to another embodiment of the present invention, the photomask may be moveable between the irradiation source and the substrate carrying the coating layer to be hardened in a synchronized translation move with the substrate.

The process for producing an optical effect layer (OEL) comprising a motif made of at least two adjacent patterns made of a single hardened layer, wherein one of said at least two adjacent patterns is based on a plurality of magnetic or magnetizable pigment particles oriented so as to follow a concave curvature when viewed from the side carrying the OEL, in particular a positive rolling bar feature, and another of said at least two adjacent patterns is based on a plurality of magnetic or magnetizable pigment particles oriented so as to follow a convex curvature when viewed from the side carrying the adjacent, in particular a negative rolling bar feature described herein advantageously provides security elements comprising at least two adjacent patterns, in particular at least two adjacent patterns exhibiting different rolling bar features, with an accurate and well-controlled separation or intermediate zone even at high speed manufacturing so as to obtain a sharp transition between said two adjacent patterns thus conferring highly dynamic and eye-catching optical effects due to the different motion of said two adjacent patterns.

Figure 10:
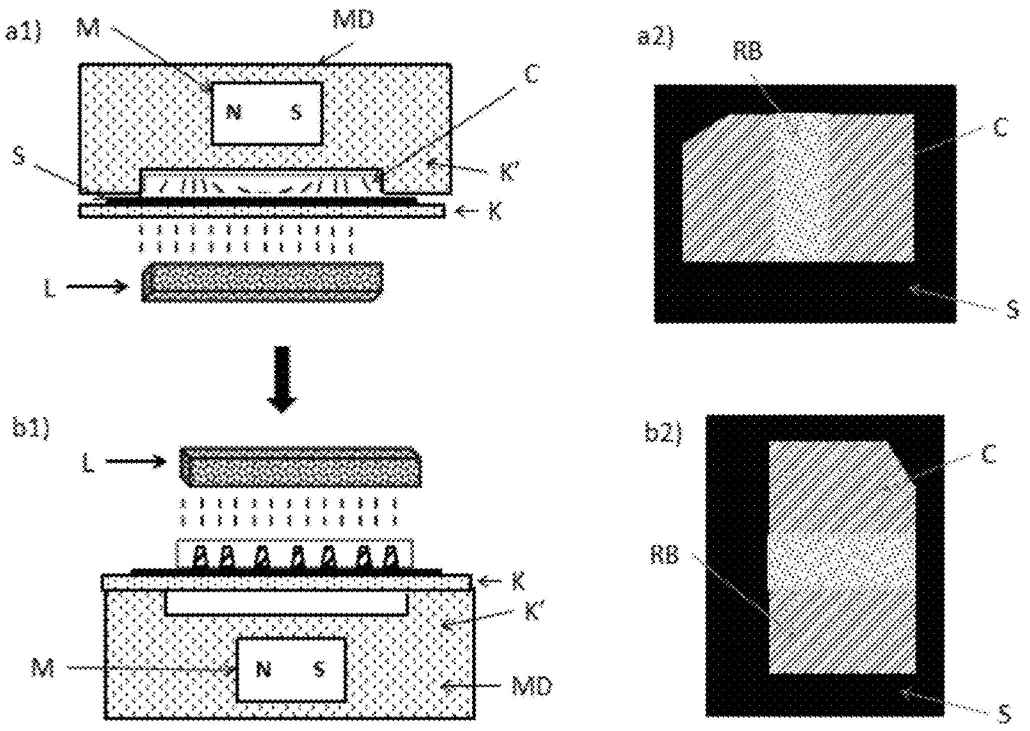
FIG. 10 schematically illustrates an experiment performed to assess the hardening level of a coating composition comprising magnetic or magnetizable pigment particles and the degree of freezing of said magnetic or magnetizable pigment particles orientation after UV-Vis irradiation through the substrate.

FIG. 10 schematically illustrates an experiment performed to assess the hardening level of the coating composition and the degree of fixation/freezing of the magnetic or magnetizable pigment particles orientation after the irradiation through the substrate. FIG. 10 a1) schematically illustrates the first step of the experiment: an OEL comprising a positive rolling bar feature was produced by orienting the magnetic or magnetizable pigment particles in the coating layer (C) with a magnetic-field-generating device (MD) located on the side of the substrate (S) carrying the coating layer (C), and, simultaneously or partially simultaneously to the orienting step with the magnetic-field-generating device (MD), hardening the coating layer by direct irradiation with a UV-Vis irradiation source located on the side of the substrate (S) opposite to the substrate surface carrying the coating layer (C) (same example as illustrated in FIG. 5A). FIG. 10 a2) schematically illustrates a top view of the substrate (S) with the rolling bar (RB) schematically illustrated by a light-colored band. FIG. 10 b1) illustrates schematically the second step of the experiment: the substrate (S) carrying the coating layer (C) with the OEL was rotated by 90° in the plane of the substrate and turned upside down so that the coating composition was facing the irradiation source to fully harden the coating composition. FIG. 10 b2) schematically illustrates a top view of the substrate (S) rotated by 90° with the rolling bar (RB) schematically illustrated by a light-colored band.

Figure 11A:
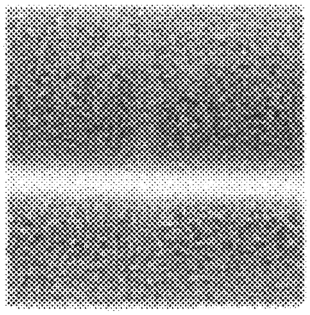
FIG. 11A-B show pictures of samples prepared according to the experiment described in FIG. 10.
Figure 11B:
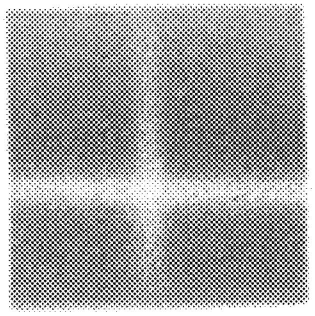

FIG. 11A-B show pictures of samples prepared according to the experiment of FIG. 10. FIG. 11A shows a sample prepared with a substrate suitable for the present invention, i.e. a substrate that fulfills the requirement of at least 4% light transmission through the substrate at 395 nm (i.e. a wavelength of the emission spectrum of the radiation source used to harden the coating composition on the substrate). As seen in FIG. 11A, the magnetic or magnetizable pigment particles are pinned by the UV-Vis irradiation through the substrate and are thus not re-oriented in the second step while the rolling bar feature is positioned in a perpendicular orientation to the magnetic axis of the magnetic bar.

FIG. 11B shows a sample prepared with a substrate not suitable for the present invention, i.e. a substrate that does not fulfill the requirement of at least 4% light transmission through the substrate at 395 nm. As seen in FIG. 11B, the magnetic or magnetizable pigment particles were not completely fixed or frozen in their orientation by the UV-Vis irradiation through the substrate. Thus the magnetic or magnetizable pigment particles were re-oriented in the second step, when the substrate was rotated by 90° in the plane of the substrate as compared to the position of the magnetic bar. The resulting OEL was a cross, i.e. two perpendicular rolling bars.

With the aim of increasing the durability through soiling or chemical resistance and cleanliness and thus the circulation lifetime of an article, a security document or a decorative element or object comprising the OEL obtained by the process described herein, or with the aim of modifying their aesthetical appearance (e.g. optical gloss), one or more protective layers may be applied on top of the OEL. When present, the one or more protective layers are typically made of protective varnishes. These may be transparent or slightly colored or tinted and may be more or less glossy. Protective varnishes may be radiation curable compositions, thermal drying compositions or any combination thereof. Preferably, the one or more protective layers are radiation curable compositions, more preferable UV-Vis curable compositions. The protective layers are typically applied after the formation of the OEL.

The present invention further provides optical effect layers (OEL) produced by the process according to the present invention.

The OEL described herein may be provided directly on a substrate on which it shall remain permanently (such as for banknote applications). Alternatively, an OEL may also be provided on a temporary substrate for production purposes, from which the OEL is subsequently removed. This may for example facilitate the production of the OEL, particularly while the binder material is still in its fluid state. Thereafter, after hardening the coating composition for the production of the OEL, the temporary substrate may be removed from the OEL.

Alternatively, in another embodiment an adhesive layer may be present on the OEL or may be present on the substrate comprising an optical effect layer (OEL), said adhesive layer being on the side of the substrate opposite the side where the OEL is provided or on the same side as the OEL and on top of the OEL. Therefore an adhesive layer may be applied to the optical effect layer (OEL) or to the substrate, said adhesive layer being applied after the hardening step has been completed. Such an article may be attached to all kinds of documents or other articles or items without printing or other processes involving machinery and rather high effort. Alternatively, the substrate described herein comprising the OEL described herein may be in the form of a transfer foil, which can be applied to a document or to an article in a separate transfer step. For this purpose, the substrate is provided with a release coating, on which the OEL are produced as described herein. One or more adhesive layers may be applied over the so produced OEL.

Also described herein are substrates comprising more than one, i.e. two, three, four, etc. optical effect layers (OEL) obtained by the process described herein.

Also described herein are articles, in particular security documents, decorative elements or objects, comprising the optical effect layer (OEL) produced according to the present invention. The articles, in particular security documents, decorative elements or objects, may comprise more than one (for example two, three, etc.) OELs produced according to the present invention.

As mentioned hereabove, the optical effect layer (OEL) produced according to the present invention may be used for decorative purposes as well as for protecting and authenticating a security document.

Typical examples of decorative elements or objects include without limitation luxury goods, cosmetic packaging, automotive parts, electronic/electrical appliances, furniture and fingernail lacquers.

Security documents include without limitation value documents and value commercial goods. Typical example of value documents include without limitation banknotes, deeds, tickets, checks, vouchers, fiscal stamps and tax labels, agreements and the like, identity documents such as passports, identity cards, visas, driving licenses, bank cards, credit cards, transactions cards, access documents or cards, entrance tickets, public transportation tickets or titles and the like, preferably banknotes, identity documents, right-conferring documents, driving licenses and credit cards. The term "value commercial good" refers to packaging materials, in particular for cosmetic articles, nutraceutical articles, pharmaceutical articles, alcohols, tobacco articles, beverages or foodstuffs, electrical/electronic articles, fabrics or jewelry, i.e. articles that shall be protected against counterfeiting and/or illegal reproduction in order to warrant the content of the packaging like for instance genuine drugs. Examples of these packaging materials include without limitation labels, such as authentication brand labels, tamper evidence labels and seals. It is pointed out that the disclosed substrates, value documents and value commercial goods are given exclusively for exemplifying purposes, without restricting the scope of the invention.

Alternatively, the optical effect layer (OEL) may be produced onto an auxiliary substrate such as for example a security thread, security stripe, a foil, a decal, a window or a label and consequently transferred to a security document in a separate step.

The skilled person can envisage several modifications to the specific embodiments described above without departing from the spirit of the present invention. Such modifications are encompassed by the present invention.

Further, all documents referred to throughout this specification are hereby incorporated by reference in their entirety as set forth in full herein.

EXAMPLES

A Cotton Banknote Paper from Louisenthal (hereafter referred as Louisenthal Velin) having a grammage of 90 g/m$^2$ was used as a substrate for the examples. The transmission spectrum (curve A in FIG. 9) of said paper substrate was measured on a Perkin Elmer Lambda 950 equipped with a Deuterium (UV) and a Xenon (VIS) lamp and a UV WinLab Data Processor (measurement mode: integration sphere transmission). The paper substrate was fixed on the sample holder and the transmission spectrum was measured between 250 nm and 500 nm.

The UV-curable screen printing ink described in Table 1 was used as a coating composition comprising optically variable magnetic pigment particles. The coating composition was applied on the substrate as a 10 mm×15 mm rectangular pattern by hand using a T90 silkscreen so as to form a coating layer.

TABLE 1

| UV-curable ink having the following formula: | |
|---|---|
| Epoxyacrylate oligomer | 28% |
| Trimethylolpropane triacrylate monomer | 19.5% |
| Tripropyleneglycol diacrylate monomer | 20% |
| Genorad ® 16 (Rahn) | 1% |
| Aerosil 200 (Evonik) | 1% |
| Speedcure ® TPO-L (Lambson) | 2% |
| IRGACURE ® 500 (BASF) | 6% |
| Genocure ® EPD (Rahn) | 2% |
| BYK ®-371 (BYK) | 2% |
| Tego Foamex N (Evonik) | 2% |
| Non-spherical optically variable magnetic pigment particles (7 layers)(*) | 16.5% |

TABLE 1-continued

| UV-curable ink having the following formula: |
|---|

(*)platelet-shaped gold-to-green optically variable magnetic pigment particles having a flake shape of diameter $d_{50}$ about 9.3 μm and thickness about 1 μm, obtained from JDS-Uniphase, Santa Rosa, CA.

A UV-LED-lamp from Phoseon (Type FireFlex 50×75 mm, 395 nm, 8 W/cm2) was used to harden the UV-curable printing ink of Table 1.

The UV-LED-lamp was positioned at a distance of 50 mm from the substrate surface on the side carrying the applied coating layer for direct irradiation. Alternatively and described hereabove, the UV-LED-lamp was located at a distance of 50 mm from the substrate surface opposite to the side carrying the coating composition for irradiation through the substrate. In both cases, the irradiation time was ½ second.

The hardening step was performed either subsequently or partially simultaneously to the orientation step with the magnetic-field-generating device and described hereabove.

Photographic images of the printed and cured samples (Lighting: Reflecta LED Videolight RPL49, Objective: AF-S Micro Nikkor 105 mm 1:2.8 G ED; Camera: Nikon D800, manual exposure, with automatic digital image enhancement options disabled for consistency) of the OEL comprising the oriented non-spherical optically variable magnetic pigment particles are shown in FIGS. 4B, 5B, 6B and 7B. In FIGS. 4B, 5B 6B and 7B, the left picture shows the OEL tilted at 30° clock-wise vertically, the picture in the middle shows the OEL viewed perpendicular to the OEL's surface, and the left picture shows the OEL tilted at 30° counter-clock-wise vertically.

Comparative Example C1 (Comparative Example FIGS. 4A and 4B)

A paper substrate (Louisenthal Velin) carrying an applied coating layer (C) made of the coating composition of Table 1 was disposed on a magnetic-field-generating device (MD) comprising a magnet (M) (NdFeB N48 permanent magnetic bar $L_{MB}$×$l_{MB}$×$h_{MB}$=30×18×6 mm) embedded in a magnetic device housing (K') (L×l×h=40×40×15 mm) made of polymer plastic (PPS), comprising on its surface a recess (L×l=20×20 with a depth of 1 mm), the magnet (M) being embedded in the center of the magnetic device housing (K') at 6 mm from the magnetic device housing surface opposite to the recess with its North-South axis being substantially parallel to coating layer. The substrate was disposed with the surface carrying the coating composition (C) facing the magnetic-field-generating device (MD) as illustrated in FIG. 4A, the distance between the magnet (M) and the coating composition (C) being 6 mm. The magnetic-field-generating device was removed from the paper substrate. The coating composition was hardened by UV-Vis irradiation with the UV-LED-lamp located on the side of the coating composition (CC) as illustrated in FIG. 4A. Pictures of the resulting OEL at three different viewing angles are shown in FIG. 4B.

Example According to the Invention E1 (FIGS. 5A and 5B)

A paper substrate (Louisenthal Velin) carrying an applied coating layer (C) made of the coating composition was disposed on a magnetic-field-generating device (MD) (same magnetic-field-generating device (MD) as used in Comparative example 1) comprising a magnet (M) (NdFeB N48 permanent magnetic bar $L_{MB}$×$l_{MB}$×$h_{MB}$=30×18×6 mm)

embedded in a magnetic device housing (K') (L×l×h=40×40×15 mm) made of polymer plastic (PPS), comprising on its surface a recess (L×l=20×20 with a depth of 1 mm), the magnet (M) being embedded in the center of the magnetic device housing (K') at 6 mm from the magnetic device housing surface opposite to the recess with its North-South axis being substantially parallel to coating layer. The substrate was disposed with the surface carrying the coating composition (C) facing the magnetic-field-generating device (MD) as illustrated in FIG. 5A, the distance between the magnet (M) and the coating layer (C) being 6 mm. The substrate was disposed with the surface carrying the coating layer (C) facing the magnetic-field-generating device (MD) as illustrated in FIG. 5A. Simultaneously with the orientation step, the coating composition was cured by UV-Vis irradiation with the UV-LED-lamp located on the side carrying the coating layer as illustrated in FIG. 5A. Pictures of the resulting optical effect layer at three different viewing angles are shown in FIG. 5B.

Comparative Example C2 (Comparative Example, FIGS. 6A and 6B)

A paper substrate (Louisenthal Velin) carrying an applied coating layer (C1) of the coating composition (CC) was disposed on a magnetic-field-generating device (MD1) (same magnetic device (MD) as used in comparative example C1) comprising a magnet (M) (NdFeB N48 permanent magnetic bar $L_{MB} \times l_{MB} \times h_{MB}$=30×18×6 mm) embedded in a magnetic device housing (K') (L×l×h=40×40×15 mm) made of polymer plastic (PPS), comprising on its surface a recess (L×l=20×20 with a depth of 1 mm), the magnet (M1) being embedded in the center of the magnetic device housing (K') at 6 mm from the magnetic device housing surface opposite to the recess with its North-South axis being substantially parallel to coating composition layer. The substrate was disposed with the surface carrying the coating layer (C1) facing the magnetic-field-generating device (MD) as illustrated in FIG. 6A j), the distance between the magnet (M1) and the coating layer (C1) being 6 mm. The coating layer (C1) was, subsequently to the orientation step, hardened by UV-Vis irradiation with the UV-LED-lamp (L) located on the side carrying the coating composition as illustrated in FIG. 6A k).

A second coating layer (C2) of the coating composition of Table 1 was applied in an area adjacent to the coating layer (C1) as illustrated in FIG. 6A l); a magnetic-field-generating device (MD2) comprising a magnet (M2) (NdFeB N48 permanent magnetic bar $L_{MB} \times l_{MB} \times h_{MB}$=30×18×6 mm) embedded in a magnetic device housing (L×l×h=40×40×15 mm) made of polymer plastic (PPS), the magnet (M2) being embedded in the center of the magnetic device housing at 6 mm from the magnetic device housing surface facing the substrate, with its North-South axis being substantially parallel to the substrate, was located on the side of the substrate (S), and simultaneously the second coating layer (C2) was hardened by UV-Vis irradiation with a UV-LED-lamp located on the side carrying the second coating layer (C2) as illustrated in FIG. 6A m). Pictures of the resulting optical effect layer at three different viewing angles are shown in FIG. 6B.

Example According to the Invention E2 (FIGS. 7A and 7B)

A paper substrate (Louisenthal Velin) carrying an applied coating layer (C1) made of the coating composition was disposed on a magnetic-field-generating device (MD1) (same magnetic-field-generating device (MD) as used in Example E1) comprising a magnet (M1) (NdFeB N48 permanent magnetic bar $L_{MB} \times l_{MB} \times h_{MB}$=30×18×6 mm) embedded in a magnetic device housing (K') (L×l×h=40×40×15 mm) made of polymer plastic (PPS), comprising on its surface a recess (L×l=20×20 with a depth of 1 mm), the magnet (M1) being embedded in the center of the magnetic device housing (K') at 6 mm from the magnetic device housing surface opposite to the recess with its North-South axis being substantially parallel to coating layer. The substrate was disposed with the surface carrying the coating layer (C1) facing the magnetic-field-generating device (MD1) as illustrated in FIG. 7A j. Simultaneously with the orientation step, the coating layer (C1) was hardened by UV-Vis irradiation with the UV-LED-lamp located on the side carrying the coating layer as illustrated in FIG. 7A j.

A second coating layer (C2) of made of the coating composition of Table 1 was applied in an area adjacent to the layer (C1) as illustrated in FIG. 7A k); a magnetic-field-generating device (MD2) (same magnetic-field-generating device (MD2) as in comparative example C2) comprising a magnet (M2) (NdFeB N48 permanent magnetic bar $L_{MB} \times l_{MB} \times h_{MB}$=30×18×6 mm) embedded in a magnetic device housing (L×l×h=40×40×15 mm) made of polymer plastic (PPS), the magnet (M2) being embedded in the center of the magnetic device housing at 6 mm from the magnetic device housing surface facing the substrate, with its North-South axis being substantially parallel to the substrate, was located on the side of the substrate opposite to the side carrying the layer (C2), and simultaneously the layer (C2) was cured by UV-Vis irradiation with a UV-LED-lamp located on the side of the substrate as illustrated in FIG. 7A l). Pictures of the resulting optical effect layer at three different viewing angles are shown in FIG. 7B.

The invention claimed is:

1. A process for producing an optical effect layer (OEL) on a substrate, said process comprising the steps of:

a) applying on the substrate a coating composition comprising a plurality of magnetic or magnetizable pigment particles so as to form a coating layer, said coating layer being in a first state, b) b1) exposing the coating layer to a magnetic field of a magnetic-field-generating device, said magnetic-field-generating device being located on a side of the coating layer thereby orienting the plurality of magnetic or magnetizable pigment particles, and b2) simultaneously or partially simultaneously hardening through the substrate the coating layer to a second state so as to fix the magnetic or magnetizable pigment particles in their adopted positions and orientations, said hardening being performed by irradiation with a UV-Vis radiation source located on a side of the substrate, wherein the substrate is transparent to one or more wavelengths of an emission spectrum of irradiation source in the range of 200 nm to 500 nm, and wherein the plurality of magnetic or magnetizable pigment particles is oriented so as to follow a concave curvature when viewed from the side carrying the OEL.

2. The process according to claim 1, wherein the applying step a) is a printing process selected from the group consisting of screen printing, rotogravure printing and flexography printing.

3. The process according to claim 1, wherein at least a part of the plurality of magnetic or magnetizable pigment particles is constituted by magnetic thin-film interference pigments, magnetic cholesteric liquid crystal pigments, interference coated pigments including one or more magnetic materials and mixtures thereof.

4. The process according to claim 1, further comprising a step c) of applying a second coating composition layer comprising a plurality of magnetic or magnetizable pigment particles so as to form a second coating layer, said coating composition being in a first state, a step d) of exposing the second coating layer in a first state to a magnetic field of a second magnetic-field-generating device thereby orienting the plurality of magnetic or magnetizable pigment particles in any pattern except a random orientation and step e) simultaneously, partially simultaneously or subsequently hardening by UV-Vis radiation the second coating layer to a second state so as to fix the magnetic or magnetizable pigment particles in their adopted positions and orientations.

5. The process according to claim 1, further comprising the steps of i) applying a second coating composition layer comprising a plurality of magnetic or magnetizable pigment particles so as to form a second coating layer, said coating composition being in a first state; ii) of exposing the second coating layer in a first state to the magnetic field of a second magnetic-field-generating device thereby orienting the plurality of magnetic or magnetizable pigment particles in any pattern except a random orientation; and iii) simultaneously, partially simultaneously or subsequently hardening by UV-Vis radiation the second coating layer to a second state so as to fix the magnetic or magnetizable pigment particles in their adopted positions and orientations, wherein said steps i), ii), iii) are carried out before the steps a) and b).

6. The process according to claim 4, wherein the step d) is carried out with the second magnetic-field-generating device thereby orienting the plurality of magnetic or magnetizable pigment particles so as to follow a convex curvature when viewed from the side carrying the coating layer.

7. A process for producing an optical effect layer (OEL) on a substrate, said OEL comprising a motif made of at least two adjacent patterns made of a single hardened layer, said process comprising the steps of:

a) applying on the substrate a coating composition comprising a plurality of magnetic or magnetizable particles so as to form a coating layer, said coating layer being in a first state;

b)

b1) exposing one or more first substrate areas carrying the coating layer to the magnetic field of a first magnetic-field-generating device, said magnetic-field-generating device being located on a side of the coating layer thereby orienting the plurality of magnetic or magnetizable pigment particles so as to follow a concave curvature when viewed from the side carrying the coating layer, and b2) simultaneously or partially simultaneously hardening through the substrate the coating layer, said hardening being performed by irradiation with a UV-Vis irradiation source located on a side of the substrate, wherein said UV-Vis irradiation source is equipped with a photomask such that one or more second substrate areas carrying the coating layer are not exposed to UV-Vis irradiation; and c) exposing at least the one or more second substrate areas carrying the coating layer which are in a first state due to the presence of the photomask under step b2) to the magnetic field of a second magnetic-field-generating device thereby orienting the plurality of magnetic or magnetizable pigment particles so as to follow any orientation except a random orientation; and simultaneously, partially simultaneously or subsequently hardening by irradiation with a UV-Vis irradiation source at least the one or more second substrate areas carrying the coating layer to a second state so as to fix the magnetic or magnetizable pigment particles in their adopted positions and orientations, wherein the substrate under step a) is transparent to one or more wavelengths of an emission spectrum of the irradiation source in the range of 200 nm to 500 nm.

8. A process for producing an optical effect layer (OEL) on a substrate, said OEL comprising a motif made of at least two adjacent patterns made of a single hardened layer, said process comprising the steps of:

a) applying on the substrate a coating composition comprising a plurality of magnetic or magnetizable particles so as to form a coating layer, said coating layer being in a first state;

b)

b1) exposing one or more first substrate areas carrying the coating layer to a magnetic field of a first magnetic-field-generating device thereby orienting the plurality of magnetic or magnetizable pigment particles so as to follow any orientation except a random orientation, and b2) simultaneously, partially simultaneously or subsequently hardening the coating layer as described herein, said hardening being performed by irradiation with a UV-Vis irradiation source equipped with a photomask such that one or more second substrate areas carrying the coating layer are not exposed to the UV-Vis irradiation; and c) exposing at least the one or more second substrate areas carrying the coating layer which are in a first state due to the presence of the photomask under step b2) to a magnetic field of a second magnetic-field-generating device, said magnetic-field-generating device being located on a side of the coating layer thereby orienting the plurality of magnetic or magnetizable pigment particles so as to follow a concave curvature when viewed from the side carrying the coating layer; and simultaneously or partially simultaneously hardening through the substrate at least the one or more second substrate areas carrying the coating layer, said hardening being performed by irradiation with a UV-Vis irradiation source located on a side of the substrate, wherein the substrate under step a) is transparent to one or more wavelengths of an emission spectrum of the irradiation source in the range of 200 nm to 500 nm.

9. The process according to claim 7, wherein the step c) is carried out with a second magnetic-field-generating device thereby orienting the plurality of magnetic or magnetizable pigment particles so as to follow a convex curvature when viewed from the side carrying the coating layer.

10. The process according to claim 7, wherein the applying step a) is a printing process selected from the group consisting of screen printing, gravure printing and flexography printing.

11. The process according to claim 7, wherein at least a part of the plurality of magnetic or magnetizable pigment particles is constituted by magnetic thin-film interference pigments, magnetic cholesteric liquid crystal pigments, interference coated pigments including one or more magnetic materials and mixtures thereof.

12. The process according to claim 4, wherein the second magnetic field generating device is located on the substrate side, and wherein a UV-Vis irradiation source for the UV-Vis radiation being applied to the second coating composition is located on the coating layer side.

13. An optical effect layer (OEL) prepared by the process recited in claim 1.

14. A security document comprising one or more optical effect layers (OEL) as recited in claim 13.

15. The process according to claim 5, wherein the step ii) is carried out with the second magnetic-field-generating device thereby orienting the plurality of magnetic or magnetizable pigment particles so as to follow a convex curvature when viewed from the side carrying the coating layer.

16. The process according to claim 8, wherein step b1) is carried out with a first magnetic-field-generating device thereby orienting the plurality of magnetic or magnetizable pigment particles so as to follow a convex curvature when viewed from the side carrying the coating layer.

17. The process according to claim 8, wherein the applying step a) is a printing process selected from the group consisting of screen printing, gravure printing and flexography printing.

18. The process according to claim 8, wherein at least a part of the plurality of magnetic or magnetizable pigment particles is constituted by magnetic thin-film interference pigments, magnetic cholesteric liquid crystal pigments, interference coated pigments including one or more magnetic materials and mixtures thereof.

19. The process according to claim 5, wherein the second magnetic field generating device is located on the substrate side, and wherein a UV-Vis irradiation source for the UV-Vis radiation being applied to the second coating composition is located on the coating layer side.

20. The process according to claim 7, wherein step c) comprises c) exposing at least the one or more second substrate areas carrying the coating layer which are in a first state due to the presence of the photomask under step b2) to the magnetic field of a second magnetic-field-generating device located on the substrate side thereby orienting the plurality of magnetic or magnetizable pigment particles so as to follow any orientation except a random orientation; and simultaneously, partially simultaneously or subsequently hardening by irradiation with a UV-Vis irradiation source located on the coating layer side at least the one or more second substrate areas carrying the coating layer to a second state so as to fix the magnetic or magnetizable pigment particles in their adopted positions and orientations.

21. The process according to claim 8, wherein step b) comprises b1) exposing one or more first substrate areas carrying the coating layer to the magnetic field of a first magnetic-field-generating device located on the substrate side thereby orienting the plurality of magnetic or magnetizable pigment particles so as to follow any orientation except a random orientation, and b2) simultaneously, partially simultaneously or subsequently hardening the coating layer by irradiation with a UV-Vis irradiation source located on the coating layer side, said source being equipped with a photomask such that one or more second substrate areas carrying the coating layer are not exposed to the UV-Vis irradiation.

22. An optical effect layer (OEL) prepared by the process recited in claim 7.

23. An optical effect layer (OEL) prepared by the process recited in claim 8.

24. A security document comprising one or more optical effect layers (OEL) as recited in claim 22.

25. A security document comprising one or more optical effect layers (OEL) as recited in claim 23.

* * * * *